(12) United States Patent
Nakamura et al.

(10) Patent No.: US 12,509,676 B2
(45) Date of Patent: Dec. 30, 2025

(54) CELL STRUCTURE, NON-HUMAN MODEL ANIMAL, METHOD FOR PRODUCING NON-HUMAN MODEL ANIMAL, AND METHOD FOR EVALUATING TEST SUBSTANCE

(71) Applicant: FUJIFILM Corporation, Tokyo (JP)

(72) Inventors: Kentaro Nakamura, Ashigarakami-gun (JP); Shinji Mima, Ashigarakami-gun (JP); Tsukasa Kitahashi, Ashigarakami-gun (JP); Chihaya Kakinuma, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 891 days.

(21) Appl. No.: 15/887,083

(22) Filed: Feb. 2, 2018

(65) Prior Publication Data

US 2018/0171324 A1   Jun. 21, 2018

Related U.S. Application Data

(63) Continuation of application No. PCT/JP2016/072137, filed on Jul. 28, 2016.

(30) Foreign Application Priority Data

Aug. 3, 2015 (JP) ................. 2015-153298

(51) Int. Cl.
| | |
|---|---|
| C12N 11/02 | (2006.01) |
| A01K 67/027 | (2024.01) |
| A01K 67/0271 | (2024.01) |
| A61K 35/13 | (2015.01) |
| A61K 35/28 | (2015.01) |
| A61K 49/00 | (2006.01) |
| A61L 27/00 | (2006.01) |
| C12N 5/095 | (2010.01) |
| G01N 33/50 | (2006.01) |

(52) U.S. Cl.
CPC .......... *C12N 11/02* (2013.01); *A01K 67/0271* (2013.01); *A61K 35/13* (2013.01); *A61K 35/28* (2013.01); *A61K 49/0008* (2013.01); *A61L 27/00* (2013.01); *C12N 5/0695* (2013.01); *G01N 33/50* (2013.01); *A01K 2207/12* (2013.01); *A01K 2207/15* (2013.01); *A01K 2207/30* (2013.01); *A01K 2227/105* (2013.01); *A01K 2267/0331* (2013.01); *C12N 2533/54* (2013.01)

(58) Field of Classification Search
CPC .......... A01K 2207/12; A01K 2207/15; A01K 2207/30; A01K 2227/105; A01K 2267/0331; A01K 67/0271; A61K 35/13; A61K 35/28; A61K 49/0008; A61L 27/00; A61P 35/00; A61P 37/04; A61P 37/06; A61P 43/00; C12N 11/02; C12N 2533/54; C12N 5/0695; G01N 33/50

See application file for complete search history.

(56) References Cited

U.S. PATENT DOCUMENTS

| | | |
|---|---|---|
| 5,032,508 A | 7/1991 | Naughton et al. |
| 2010/0203638 A1 | 8/2010 | Adachi et al. |
| 2012/0251528 A1 | 10/2012 | Leskov et al. |
| 2012/0329157 A1 | 12/2012 | Nakamura |
| 2013/0019327 A1 | 1/2013 | Suzuki et al. |
| 2013/0071441 A1 | 3/2013 | Iwazawa et al. |
| 2013/0198876 A1 | 8/2013 | Ishikawa |
| 2015/0352252 A1 | 12/2015 | Nakamura et al. |
| 2016/0303282 A1 | 10/2016 | Nakamura et al. |
| 2017/0203005 A1 | 7/2017 | Iwazawa et al. |
| 2018/0140745 A1 | 5/2018 | Nakamura |

FOREIGN PATENT DOCUMENTS

| | | |
|---|---|---|
| CN | 102762592 A | 10/2012 |
| CN | 103239479 A | 8/2013 |
| CN | 103911342 A | 7/2014 |
| CN | 107835697 A | 3/2018 |
| EP | 1 857 543 A1 | 11/2007 |
| EP | 2 543 397 A1 | 1/2013 |
| EP | 2 564 880 A1 | 3/2013 |
| JP | H 4-501657 A | 3/1992 |
| JP | 2001-520011 A | 10/2001 |

(Continued)

OTHER PUBLICATIONS

Andrew G Clark, Modes of cancer cell invasion and the role of the microenvironment, Current Opinion in Cell Biology 2015, 36:13-22.*
Lars Bryngelson Ohlsson, Mesenchymal progenitor cell-mediated inhibition of tumor growth in vivo and in vitro in gelatin matrix, Experimental and Molecular Pathology 75 (2003) 248-255.*
Google Translation of WO2014133081 A1, accessed on Apr. 14, 2021, pp. 1-22.*
1-Google Translation of WO201108517 A1, accessed on Apr. 14, 2021, pp. 1-18.*
Cole R. Drifka et al., "A bioengineered heterotypic stroma-cancer microenvironment model to study pancreatic ductal adenocarcinoma", Lab Chip, vol. 13, No. 19, Oct. 7, 2013, pp. 3965-3975 (23 pages total).

(Continued)

*Primary Examiner* — Julie Ha
*Assistant Examiner* — Erinne R Dabkowski
(74) *Attorney, Agent, or Firm* — Sughrue Mion, PLLC

(57) ABSTRACT

An object of the present invention is to provide a non-human model animal rich in stromal tissue, a cell structure useful for producing the above-described non-human model animal, a method for evaluating a test substance in which the above-described non-human model animal is used, and a method for producing the above-described non-human model animal. According to the present invention, a cell structure is provided which contains a biocompatible macromolecular block and at least a cancer cell and a mesenchymal cell, and in which a plurality of the above-described biocompatible macromolecular blocks are arranged in gaps between a plurality of the above-described cells.

6 Claims, 5 Drawing Sheets

Specification includes a Sequence Listing.

(56) References Cited

FOREIGN PATENT DOCUMENTS

| | | |
|---|---|---|
| JP | 2007-43975 A | 2/2007 |
| JP | 2011-19513 A | 2/2011 |
| JP | 2012-000058 A | 1/2012 |
| JP | 2014-12114 A | 1/2014 |
| JP | 2015-047078 A | 3/2015 |
| WO | 2006/088029 A1 | 8/2006 |
| WO | 2007/138098 A2 | 12/2007 |
| WO | 2011/078301 A1 | 6/2011 |
| WO | 2011/108517 A1 | 9/2011 |
| WO | 2011/148983 A1 | 12/2011 |
| WO | 2014/133081 A1 | 9/2014 |
| WO | 2015/017626 A1 | 2/2015 |
| WO | 2015/046216 A1 | 4/2015 |
| WO | 2016/052504 A1 | 4/2016 |
| WO | 2017/010414 A1 | 1/2017 |

OTHER PUBLICATIONS

Lei Dai et al., "Construction of orthotopic xenograft mouse models for human pancreatic cancer", Experimental and Therapeutic Medicine, vol. 10, No. 3, Jul. 16, 2015, pp. 1033-1038 (6 pages total).

Stacey J Coleman et al., "Pancreatic cancer organotypics: High throughput, preclinical models for pharmacological agent evaluation", World Journal of Gastroenterology, vol. 20, No. 26, Jul. 14, 2014, pp. 8471-8481 (12 pages total).

Sylvia F. Boj et al., "Organoid Models of Human and Mouse Ductal Pancreatic Cancer", Cell, Cell Press, vol. 160, No. 1, Jan. 15, 2015, pp. 324-338 (15 pages total).

Claus Kordes et al., "Stellate cells are mesenchymal stem cells", European Journal of Medical Research, vol. 19, No. Suppl 1, 2014, p. S6 (2 pages total).

Kenneth P. Olive, et al., "Inhibition of Hedgehog Signaling Enhances Delivery of Chemotherapy in a Mouse Model of Pancreatic Cancer", Science, vol. 324, No. 5933, Jun. 12, 2009, pp. 1457-1461 (6 pages total).

Viswanath Das et al., "Pathophysiologically relevant in vitro tumor models for drug screening", Drug Discovery Today, vo. 20, No. 7, Jul. 2015, pp. 848-855 (8 pages total).

Extended European Search Report dated Jun. 25, 2018 issued by the European Patent Office in corresponding European Application No. 16832892.0.

Communication dated May 7, 2019, from the Japanese Patent Office in counterpart Japanese application No. 2017-532538.

Office Action dated Dec. 10, 2019, from the Japanese Patent Office in Japanese application No. 2017-532538.

International Search Report dated Sep. 13, 2016 in counterpart international application No. PCT/JP2016/072137.

Olive et al., "Inhibition of Hedgehog Signaling Enhances Delivery of Chemotherapy in a Mouse Model of Pancreatic Cancer", NIH Public Access Author Manuscript; Science, vol. 324, No. 5933, Jun. 12, 2009, pp. 1457-1461. (10 pages total).

International Preliminary Report on Patentability dated Feb. 6, 2018 in counterpart international application No. PCT/JP2016/072137.

Written Opinion dated Sep. 13, 2016 in counterpart international application No. PCT/JP2016/072137.

Talukdar et al., "Engineered 3D Silk-Based Metastasis Models: Interactions Between Human Breast Adenocarcinoma, Mesenchymal Stem Cells and Osteoblast-Like Cells", Advanced Functional Materials, vol. 23, 2013, pp. 5249-5260. (12 pages total).

Fang et al., "Tumor Bioengineering Using a Transglutaminase Crosslinked Hydrogel", Plos One, vol. 9, Issue 8, Aug. 2014, pp. 1-10.

Communication dated Apr. 8, 2021 from the European Patent Office in Application No. 16832892.0.

John W. Cassidy et al., "Maintaining Tumor Heterogeneity in Patient-Derived Tumor Xenografts", Cancer Research, Jul. 15, 2015, vol. 75, No. 15, pp. 2963-2968 (7 pages total).

Mariano Ponz-Sarvise, MD, Phd et al., "Mouse Models of Pancreatic Ductal Adenocarcinoma", Hematology—Oncology Clinics of North America, Aug. 1, 2015, vol. 29, No. 4, pp. 609-617 (9 pages total).

Laurent Bartholin, "Pancreatic cancer and the tumor microenvironment: Mesenchyme's role in pancreatic carcinogenesis" NCBI Bookself, Jan. 1, 2012, retrieved from the internet: URL:https://www.ncbi.nlm.nih.gov/books/NBK98929/ (25 pages total).

Office Action dated Dec. 21, 2020, from the China National Intellectual Property Administration in Chinese Application No. 201680045485.3.

Office Action dated Apr. 14, 2020, from the China National Intellectual Property Administration in Chinese Application No. 201680045485.3.

Office Action dated Jun. 15, 2021, from the Japanese Patent Office in counterpart Japanese application No. 2020-091250.

Office Action dated Jan. 18, 2022 from the Japanese Patent Office in JP Application No. 2020-091250.

Office Action dated Aug. 22, 2022 issued by the European Patent Office in European Application No. 16 832 892.0.

\* cited by examiner

THERE IS NO BIOCOMPATIBLE MACROMOLECULAR BLOCK

THERE IS BIOCOMPATIBLE MACROMOLECULAR BLOCK

SEQUENCE LISTING

```
<160> NUMBER OF SEQ ID NOS: 11

<210> SEQ ID NO 1
<211> LENGTH: 571
<212> TYPE: PRT
<213> ORGANISM: Artificial Sequence
<220> FEATURE:
<223> OTHER INFORMATION: Synthetic recombinant peptide sequence

<400> SEQUENCE: 1

Gly Ala Pro Gly Ala Pro Gly Leu Gln Gly Ala Pro Gly Leu Gln Gly
1               5                   10                  15

Met Pro Gly Glu Arg Gly Ala Ala Gly Leu Pro Gly Pro Lys Gly Glu
            20                  25                  30

Arg Gly Asp Ala Gly Pro Lys Gly Ala Asp Gly Ala Pro Gly Ala Pro
        35                  40                  45

Gly Leu Gln Gly Met Pro Gly Glu Arg Gly Ala Ala Gly Leu Pro Gly
```

```
                50                  55                  60
Pro Lys Gly Glu Arg Gly Asp Ala Gly Pro Lys Gly Ala Asp Gly Ala
 65                  70                  75                  80

Pro Gly Lys Asp Gly Val Arg Gly Leu Ala Gly Pro Ile Gly Pro Pro
                 85                  90                  95

Gly Glu Arg Gly Ala Ala Gly Leu Pro Gly Pro Lys Gly Glu Arg Gly
                100                 105                 110

Asp Ala Gly Pro Lys Gly Ala Asp Gly Ala Pro Gly Lys Asp Gly Val
                115                 120                 125

Arg Gly Leu Ala Gly Pro Ile Gly Pro Pro Gly Pro Ala Gly Ala Pro
                130                 135                 140

Gly Ala Pro Gly Leu Gln Gly Met Pro Gly Glu Arg Gly Ala Ala Gly
145                 150                 155                 160

Leu Pro Gly Pro Lys Gly Glu Arg Gly Asp Ala Gly Pro Lys Gly Ala
                165                 170                 175

Asp Gly Ala Pro Gly Lys Asp Gly Val Arg Gly Leu Ala Gly Pro Pro
                180                 185                 190

Gly Ala Pro Gly Leu Gln Gly Ala Pro Gly Leu Gln Gly Met Pro Gly
                195                 200                 205

Glu Arg Gly Ala Ala Gly Leu Pro Gly Pro Lys Gly Glu Arg Gly Asp
                210                 215                 220

Ala Gly Pro Lys Gly Ala Asp Gly Ala Pro Gly Ala Pro Gly Leu Gln
225                 230                 235                 240

Gly Met Pro Gly Glu Arg Gly Ala Ala Gly Leu Pro Gly Pro Lys Gly
                245                 250                 255

Glu Arg Gly Asp Ala Gly Pro Lys Gly Ala Asp Gly Ala Pro Gly Lys
                260                 265                 270

Asp Gly Val Arg Gly Leu Ala Gly Pro Ile Gly Pro Pro Gly Glu Arg
                275                 280                 285

Gly Ala Ala Gly Leu Pro Gly Pro Lys Gly Glu Arg Gly Asp Ala Gly
                290                 295                 300

Pro Lys Gly Ala Asp Gly Ala Pro Gly Lys Asp Gly Val Arg Gly Leu
305                 310                 315                 320

Ala Gly Pro Ile Gly Pro Pro Gly Pro Ala Gly Ala Pro Gly Ala Pro
                325                 330                 335

Gly Leu Gln Gly Met Pro Gly Glu Arg Gly Ala Ala Gly Leu Pro Gly
                340                 345                 350

Pro Lys Gly Glu Arg Gly Asp Ala Gly Pro Lys Gly Ala Asp Gly Ala
                355                 360                 365

Pro Gly Lys Asp Gly Val Arg Gly Leu Ala Gly Pro Pro Gly Ala Pro
                370                 375                 380

Gly Leu Gln Gly Ala Pro Gly Leu Gln Gly Met Pro Gly Glu Arg Gly
385                 390                 395                 400

Ala Ala Gly Leu Pro Gly Pro Lys Gly Glu Arg Gly Asp Ala Gly Pro
                405                 410                 415

Lys Gly Ala Asp Gly Ala Pro Gly Ala Pro Gly Leu Gln Gly Met Pro
                420                 425                 430

Gly Glu Arg Gly Ala Ala Gly Leu Pro Gly Pro Lys Gly Glu Arg Gly
                435                 440                 445

Asp Ala Gly Pro Lys Gly Ala Asp Gly Ala Pro Gly Lys Asp Gly Val
                450                 455                 460

Arg Gly Leu Ala Gly Pro Ile Gly Pro Pro Gly Glu Arg Gly Ala Ala
465                 470                 475                 480
```

```
Gly Leu Pro Gly Pro Lys Gly Glu Arg Gly Asp Ala Gly Pro Lys Gly
                485                 490                 495

Ala Asp Gly Ala Pro Gly Lys Asp Gly Val Arg Gly Leu Ala Gly Pro
            500                 505                 510

Ile Gly Pro Pro Gly Pro Ala Gly Ala Pro Gly Ala Pro Gly Leu Gln
        515                 520                 525

Gly Met Pro Gly Glu Arg Gly Ala Ala Gly Leu Pro Gly Pro Lys Gly
    530                 535                 540

Glu Arg Gly Asp Ala Gly Pro Lys Gly Ala Asp Gly Ala Pro Gly Lys
545                 550                 555                 560

Asp Gly Val Arg Gly Leu Ala Gly Pro Pro Gly
                565                 570

<210> SEQ ID NO 2
<211> LENGTH: 4
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 2

Arg Glu Asp Val
1

<210> SEQ ID NO 3
<211> LENGTH: 5
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 3

Tyr Ile Gly Ser Arg
1               5

<210> SEQ ID NO 4
<211> LENGTH: 5
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 4

Pro Asp Ser Gly Arg
1               5

<210> SEQ ID NO 5
<211> LENGTH: 7
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 5

Arg Tyr Val Val Leu Pro Arg
1               5

<210> SEQ ID NO 6
<211> LENGTH: 6
<212> TYPE: PRT
```

```
<213> ORGANISM: Artificial Sequence
<220> FEATURE:
<223> OTHER INFORMATION: Description of Artificial Sequence: synthetic
      adhesive sequence

<400> SEQUENCE: 6

Leu Gly Thr Ile Pro Gly
1               5

<210> SEQ ID NO 7
<211> LENGTH: 10
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 7

Arg Asn Ile Ala Glu Ile Ile Lys Asp Ile
1               5                   10

<210> SEQ ID NO 8
<211> LENGTH: 5
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 8

Ile Lys Val Ala Val
1               5

<210> SEQ ID NO 9
<211> LENGTH: 4
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 9

Asp Gly Glu Ala
1

<210> SEQ ID NO 10
<211> LENGTH: 4
<212> TYPE: PRT
<213> ORGANISM: Artificial Sequence
<220> FEATURE:
<223> OTHER INFORMATION: Description of Artificial Sequence: synthetic
      adhesive sequence

<400> SEQUENCE: 10

Glu Arg Gly Asp
1

<210> SEQ ID NO 11
<211> LENGTH: 571
<212> TYPE: PRT
<213> ORGANISM: Artificial Sequence
<220> FEATURE:
<223> OTHER INFORMATION: synthetic recombinant gelatin sequence
<220> FEATURE:
<221> NAME/KEY: MISC_FEATURE
<222> LOCATION: (1)..(571)
<223> OTHER INFORMATION: all Xaa is independently any amino acid

<400> SEQUENCE: 11
```

```
Gly Ala Pro Gly Xaa Xaa Gly Xaa Xaa Gly Xaa Xaa Gly Xaa Xaa Gly
1               5                   10                  15

Xaa Xaa Gly Xaa Xaa Gly Xaa Xaa Gly Xaa Xaa Gly Xaa Xaa Gly Xaa
            20                  25                  30

Xaa Gly Xaa Xaa Gly Xaa Xaa Gly Xaa Xaa Gly Xaa Xaa Gly Xaa Xaa
        35                  40                  45

Gly Xaa Xaa Gly Xaa Xaa Gly Xaa Xaa Gly Xaa Xaa Gly Xaa Xaa Gly
50                  55                  60

Xaa Xaa Gly Xaa Xaa Gly Xaa Xaa Gly Xaa Xaa Gly Xaa Xaa Gly Xaa
65                  70                  75                  80

Xaa Gly Xaa Xaa Gly Xaa Xaa Gly Xaa Xaa Gly Xaa Xaa Gly Xaa Xaa
        85                  90                  95

Gly Xaa Xaa Gly Xaa Xaa Gly Xaa Xaa Gly Xaa Xaa Gly Xaa Xaa Gly
            100                 105                 110

Xaa Xaa Gly Xaa Xaa Gly Xaa Xaa Gly Xaa Xaa Gly Xaa Xaa Gly Xaa
            115                 120                 125

Xaa Gly Xaa Xaa Gly Xaa Xaa Gly Xaa Xaa Gly Xaa Xaa Gly Xaa Xaa
        130                 135                 140

Gly Xaa Xaa Gly Xaa Xaa Gly Xaa Xaa Gly Xaa Xaa Gly Xaa Xaa Gly
145                 150                 155                 160

Xaa Xaa Gly Xaa Xaa Gly Xaa Xaa Gly Xaa Xaa Gly Xaa Xaa Gly Xaa
            165                 170                 175

Xaa Gly Xaa Xaa Gly Xaa Xaa Gly Xaa Xaa Gly Xaa Xaa Gly Xaa Xaa
        180                 185                 190

Gly Xaa Xaa Gly Xaa Xaa Gly Xaa Xaa Gly Xaa Xaa Gly Xaa Xaa Gly
            195                 200                 205

Xaa Xaa Gly Xaa Xaa Gly Xaa Xaa Gly Xaa Xaa Gly Xaa Xaa Gly Xaa
210                 215                 220

Xaa Gly Xaa Xaa Gly Xaa Xaa Gly Xaa Xaa Gly Xaa Xaa Gly Xaa Xaa
225                 230                 235                 240

Gly Xaa Xaa Gly Xaa Xaa Gly Xaa Xaa Gly Xaa Xaa Gly Xaa Xaa Gly
            245                 250                 255

Xaa Xaa Gly Xaa Xaa Gly Xaa Xaa Gly Xaa Xaa Gly Xaa Xaa Gly Xaa
            260                 265                 270

Xaa Gly Xaa Xaa Gly Xaa Xaa Gly Xaa Xaa Gly Xaa Xaa Gly Xaa Xaa
        275                 280                 285

Gly Xaa Xaa Gly Xaa Xaa Gly Xaa Xaa Gly Xaa Xaa Gly Xaa Xaa Gly
            290                 295                 300

Xaa Xaa Gly Xaa Xaa Gly Xaa Xaa Gly Xaa Xaa Gly Xaa Xaa Gly Xaa
305                 310                 315                 320

Xaa Gly Xaa Xaa Gly Xaa Xaa Gly Xaa Xaa Gly Xaa Xaa Gly Xaa Xaa
        325                 330                 335

Gly Xaa Xaa Gly Xaa Xaa Gly Xaa Xaa Gly Xaa Xaa Gly Xaa Xaa Gly
            340                 345                 350

Xaa Xaa Gly Xaa Xaa Gly Xaa Xaa Gly Xaa Xaa Gly Xaa Xaa Gly Xaa
            355                 360                 365

Xaa Gly Xaa Xaa Gly Xaa Xaa Gly Xaa Xaa Gly Xaa Xaa Gly Xaa Xaa
        370                 375                 380

Gly Xaa Xaa Gly Xaa Xaa Gly Xaa Xaa Gly Xaa Xaa Gly Xaa Xaa Gly
385                 390                 395                 400

Xaa Xaa Gly Xaa Xaa Gly Xaa Xaa Gly Xaa Xaa Gly Xaa Xaa Gly Xaa
            405                 410                 415
```

-continued

```
Xaa Gly Xaa Xaa Gly Xaa Xaa Gly Xaa Xaa Gly Xaa Xaa
            420             425             430

Gly Xaa Xaa Gly Xaa Xaa Gly Xaa Xaa Gly Xaa Xaa Gly
        435             440             445

Xaa Xaa Gly Xaa Xaa Gly Xaa Xaa Gly Xaa Xaa Gly Xaa
    450             455             460

Xaa Gly Xaa Xaa Gly Xaa Xaa Gly Xaa Xaa Gly Xaa Xaa
465             470             475             480

Gly Xaa Xaa Gly Xaa Xaa Gly Xaa Xaa Gly Xaa Xaa Gly
        485             490             495

Xaa Xaa Gly Xaa Xaa Gly Xaa Xaa Gly Xaa Xaa Gly Xaa
        500             505             510

Xaa Gly Xaa Xaa Gly Xaa Xaa Gly Xaa Xaa Gly Xaa Xaa
        515             520             525

Gly Xaa Xaa Gly Xaa Xaa Gly Xaa Xaa Gly Xaa Xaa Gly
        530             535             540

Xaa Xaa Gly Xaa Xaa Gly Xaa Xaa Gly Xaa Xaa Gly Xaa
545             550             555             560

Xaa Gly Xaa Xaa Gly Xaa Xaa Gly Xaa Xaa Gly
            565             570
```

CELL STRUCTURE, NON-HUMAN MODEL ANIMAL, METHOD FOR PRODUCING NON-HUMAN MODEL ANIMAL, AND METHOD FOR EVALUATING TEST SUBSTANCE

CROSS-REFERENCE TO RELATED APPLICATIONS

This application is a Continuation of PCT International Application No. PCT/JP2016/072137 filed on Jul. 28, 2016, which claims priority under 35 U.S.C § 119(a) to Japanese Patent Application No. 2015-153298 filed on Aug. 3, 2015. Each of the above application(s) is hereby expressly incorporated by reference, in its entirety, into the present application.

BACKGROUND OF THE INVENTION

1. Field of the Invention

The present invention relates to a cell structure useful for producing a non-human model animal for a cancer disease. The present invention further relates to a non-human model animal for a cancer disease and a method for producing the same. The present invention further relates to a method for evaluating a test substance using the above-described non-human model animal.

2. Description of the Related Art

Pancreatic cancer, as an example of cancer, is intractable cancer with an average survival time of 3 to 6 months. Various animal models are used for developing a cancer remedy of pancreatic cancer or the like. For example, a cancer-bearing mouse model is used which is xenograft model in which a human pancreatic cancer cell is transplanted into an immunodeficient mouse. However, sufficient amount of stromal tissue does not develop in the above-described animal model, and therefore, pancreatic cancer in the animal model is quite different from a state of actual pancreatic cancer. As a result, from the fact that certain cancer such as pancreatic cancer, in particular, is rich in stroma and fibrosis is remarkable, it has become known that the cancer-bearing mouse model is not suitable for developing an effective cancer remedy. It is actually known that gemcitabine which has been developed as an effective remedy using the above-described animal model does not exhibit sufficient effectiveness in humans. It has been reported that this is because gemcitabine does not reach a cancer cell since stroma (stroma tissue) is fibrotic and poor in blood vessels (Science 324:1457-1461, 2009 Inhibition of Hedgehog Signaling Enhances Delivery of Chemotherapy in a Mouse Model of Pancreatic Cancer).

On the other hand, a cell structure, which contains cells and macromolecular blocks having biocompatibility, and in which the plurality of the above-described macromolecular blocks are arranged in gaps between the plurality of the above-described cells, is disclosed in WO2011/108517A. In the cell structure disclosed in WO2011/108517A, it is possible to deliver nutrients to the inside of the cell structure from the outside. The cell structure has a sufficient thickness, and cells exist in the structure uniformly. In examples of WO2011/108517A, high cell survival activity is verified using a macromolecular block formed of a recombinant gelatin material or a natural gelatin material. In addition, a cell structure for cell transplantation, which contains a macromolecular block having biocompatibility and at least one kind of cell, and in which the plurality of the above-described macromolecular blocks are arranged in the gaps between the plurality of the above-described cells, is disclosed in JP2014-12114A.

SUMMARY OF THE INVENTION

In order to provide an evaluation model rich in stromal tissue as an evaluation model of cancer such as pancreatic cancer, attempts have been made to obtain a cancer evaluation model having stroma by transplanting tumor tissue derived from a cancer patient into a mouse, and many studies have been performed as patient-derived xenograft (PDX). However, it has been found that sufficient amount of stromal tissue is not actually formed. There is a mixture of a plurality of kinds of cells or extracellular matrixes in tumor tissue derived from a specimen of a patient with cancer, and therefore the composition of the content of the tumor tissue cannot be specified. As a result, rich or poor formation of stroma makes the results obtained from an evaluation model vary. In addition, since the tissue derived from a patient with cancer is used, it is impossible to perform stable amplification. Therefore, there is a problem in that the number of tests in which the same evaluation model can be used is limited.

As described above, development of non-human model animals which are rich in stromal tissue and with which it is possible to evaluate cancer in vivo has been desired. An object of the present invention is to provide a non-human model animal rich in stromal tissue. Another object of the present invention is to provide a cell structure useful for producing the above-described non-human model animal, a method for evaluating a test substance in which the above-described non-human model animal is used, and a method for producing the above-described non-human model animal.

The present inventors have conducted extensive studies in order to solve the above-described problems, and as a result, they have found that it is possible to produce a model animal for evaluating cancer in vivo which is rich in stromal tissue, by producing a cell structure containing a biocompatible macromolecular block, a cancer cell, and a mesenchymal cell and transplanting the above-described cell structure into a mouse. The present invention has been completed based on these findings.

That is, according to the present invention, the following inventions are provided.

(1) A cell structure comprising: a biocompatible macromolecular block; and at least a cancer cell and a mesenchymal cell, in which a plurality of the biocompatible macromolecular blocks are arranged in gaps between a plurality of the cells.

(2) The cell structure according to (1), in which the cell structure is transplanted into a non-human animal in order to produce a non-human model animal.

(3) The cell structure according to (1) or (2), in which the cancer cell is an established cancer cell.

(4) The cell structure according to any one of (1) to (3), in which the cancer cell is a pancreatic cancer cell.

(5) The cell structure according to any one of (1) to (4), in which the mesenchymal cell is a mesenchymal stem cell.

(6) The cell structure according to any one of (1) to (5), in which a biocompatible macromolecule is recombinant gelatin.

(7) The cell structure according to (6), in which the recombinant gelatin is represented by the following formula, A-[(Gly-X-Y)$_n$]$_m$—B        Formula: 5 in the formula, A represents an arbitrary amino acid or an amino acid sequence, B represents an arbitrary amino acid or an amino acid sequence, n pieces of X each independently represent any amino acid, n pieces of Y each independently represent any amino acid, n represents an integer of 3 to 100, and m represents an integer of 2 to 10; and n pieces of Gly-X-Y may be the same as or different from each other.

(8) The cell structure according to (6) or (7), in which the recombinant gelatin is any one of a peptide formed of an amino acid sequence described in SEQ ID No: 1; a peptide which is formed of an amino acid sequence in which one or several amino acids are deleted, substituted, or added in the amino acid sequence described in SEQ ID No: 1, and has biocompatibility; and a peptide which is formed of an amino acid sequence having 80% or more sequence identity to the amino acid sequence described in SEQ ID No: 1, and has biocompatibility.

(9) A non-human model animal for a cancer disease, comprising: a cell structure which contains a biocompatible macromolecular block and at least a cancer cell and a mesenchymal cell and in which a plurality of the biocompatible macromolecular blocks are arranged in gaps between a plurality of the cells, as a transplant.

(10) The non-human model animal according to (9), in which the cancer cell is an established cancer cell.

(11) The non-human model animal according to (9) or (10), in which the cancer cell is a pancreatic cancer cell and the cancer disease is pancreatic cancer.

(12) The non-human model animal according to any one of (9) to (11), in which the mesenchymal cell is a mesenchymal stem cell.

(13) The non-human model animal according to any one of (9) to (12), in which a site into which the cell structure is to be transplanted is under the skin.

(14) The non-human model animal according to any one of (9) to (13), which has decreased immunity or is immunodeficient.

(15) A method for producing a non-human model animal for a cancer disease, comprising: transplanting the cell structure according to any one of (1) to (8) into a non-human animal.

(16) A method for evaluating a test substance, comprising: administering a test substance to the non-human model animal according to any one of (9) to (14).

The cell structure of the present invention is useful for producing a non-human model animal rich in stromal tissue. The non-human model animal of the present invention is useful as a model animal for a cancer disease since it is rich in stromal tissue. According to the non-human model animal and the method for producing the same according to the present invention, it is possible to provide the model animal for a cancer disease. According to the method for evaluating a test substance of the present invention, it is possible to efficiently evaluate a medicine.

DESCRIPTION OF THE PREFERRED EMBODIMENTS

Figure 1:
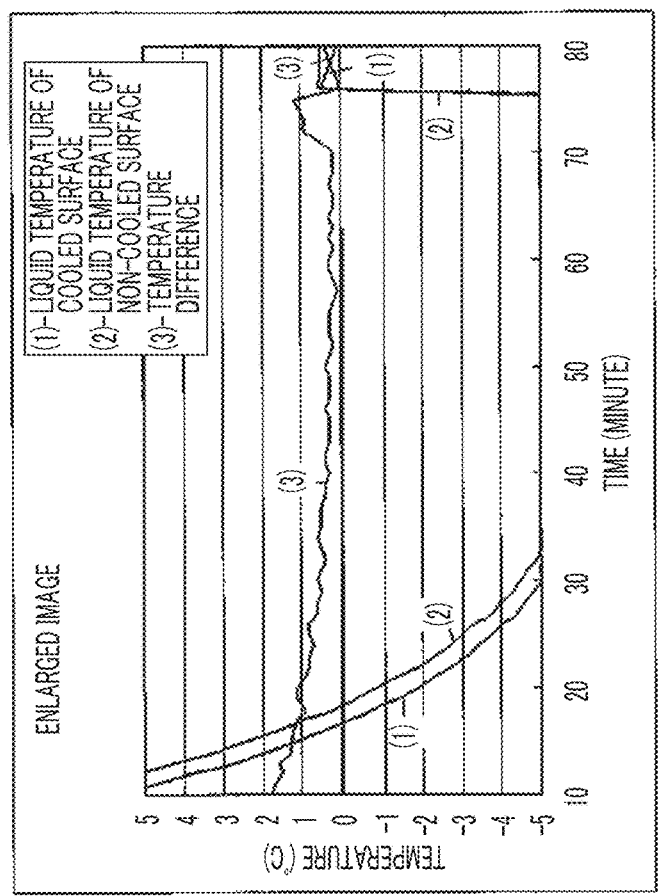
FIG. 1 shows a liquid temperature profile of a condition A of examples.
Figure 1:
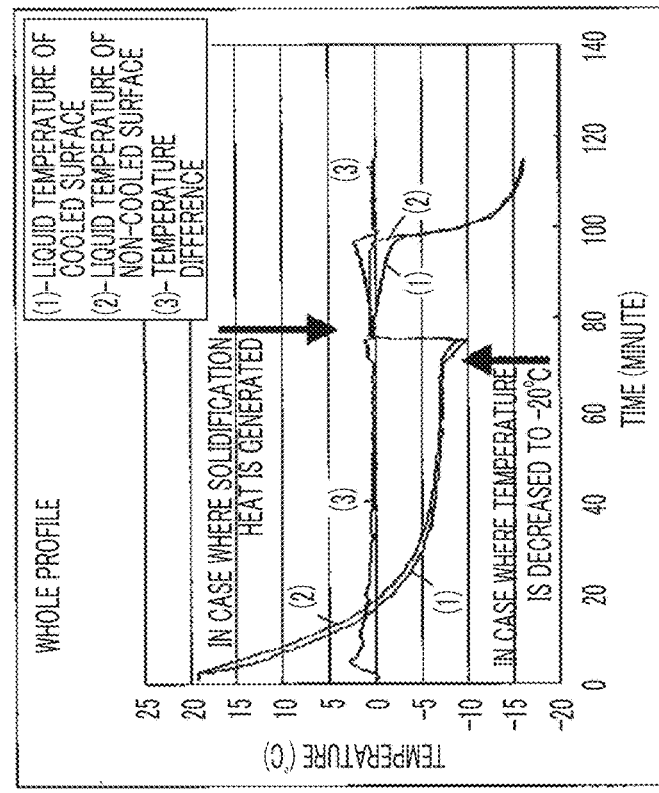

Hereinafter, an embodiment of the present invention will be described in detail.

The present invention relates to a cell structure containing a biocompatible macromolecular block and at least a cancer cell and a mesenchymal cell, in which a plurality of the above-described biocompatible macromolecular blocks are arranged in gaps between a plurality of the cells. The present invention further relates to a non-human model animal for a cancer disease which has the above-described cell structure as a transplant, a method for evaluating a test substance in which the above-described non-human model animal is used, and a method for producing the above-described non-human model animal.

In some cases, the cell structure of the present invention is called a mosaic cell aggregation (a cell aggregation in a mosaic shape) in the present specification.

In the present invention, by transplanting a cell structure containing a biocompatible macromolecular block, a cancer cell, and a mesenchymal cell into a non-human animal, it is possible to produce a model animal for evaluating cancer in vivo which is rich in stromal tissue. Being possible to produce a non-human model animal richer in stromal tissue compared to a case where a model animal is produced by transplanting a cell aggregation containing a cancer cell and a mesenchymal cell into a non-human animal without using a biocompatible macromolecular block is a finding first found by the present invention, and is completely unexpected from the related art.

Based on the achievement of the present invention, it is considered from the results that the biocompatible macromolecular block may be able to successfully provide a place for forming stroma by providing an adequate space between a cancer cell and a mesenchymal cell at the same time as contributing to grafting of the cancer cell and the mesenchymal cell. It is possible to consider that stromal tissue which has not been born only by a mesenchymal cell and a cancer cell has been formed by providing a place for forming stroma.

(1) Biocompatible Macromolecular Block (1-1) Biocompatible Macromolecules

Biocompatibility means a property which does not cause a significantly harmful reaction such as a long-term and chronic inflammatory reaction, during contact with a living body. Whether or not the biocompatible macromolecules used in the present invention are decomposed within a living body is not particularly limited as long as the biocompatible macromolecules have affinity to the living body. However, biodegradable macromolecules are preferable. Specific examples of non-biodegradable materials include polytetrafluoroethylene (PTFE), polyurethane, polypropylene, polyester, vinyl chloride, polycarbonate, acryl, stainless steel, titanium, silicone, and 2-methacryloyloxyethyl phosphorylcholine (MPC). Specific examples of the biodegradable materials include polypeptide (for example, gelatin or the like to be described below) such as recombinant peptide or chemically synthesized peptide, polylactic acid, polyglycolic acid, lactic acid-glycolic acid copolymers (PLGA), hyaluronic acid, glycosaminoglycan, proteoglycan, chondroitin, cellulose, agarose, carboxymethyl cellulose, chitin, and chitosan. Among these, recombinant peptide is particularly preferable. Devising of an improvement of cell adhesion properties in these biocompatible macromolecules may be performed. Specifically, methods such as "coating of the surface of a base material with a cell adhesion substrate (fibronectin, vitronectin, or laminin) or peptides of a cell adhesion sequence (an RGD sequence, an LDV sequence, an REDV sequence (SEQ ID No: 2), a YIGSR sequence (SEQ ID No: 3), a PDSGR sequence (SEQ ID No: 4), an RYVVLPR sequence (SEQ ID No: 5), an LGTIPG sequence (SEQ ID No: 6), an RNIAEIIKDI sequence (SEQ ID No: 7), an IKVAV sequence (SEQ ID No: 8), an LRE sequence, a DGEA sequence (SEQ ID No: 9), and a HAV sequence, which are represented by one-letter notation of amino acids)", "aminization or cationization of the surface of a base material", or "plasma treatment performed on the surface of a base material or hydrophilic treatment due to corona discharge" can be used.

The kind of polypeptide containing a recombinant peptide or a chemically synthesized peptide is not particularly limited as long as a polypeptide has biocompatibility. For example, gelatin, collagen, elastin, fibronectin, pronectin, laminin, tenascin, fibrin, fibroin, entactin, thrombospondin, and retronectin are preferable and gelatin, collagen, and atelocollagen are most preferable. As the gelatin to be used in the present invention, natural gelatin, recombinant gelatin, or chemically synthesized gelatin is preferable and recombinant gelatin is more preferable. The natural gelatin referred to herein means gelatin produced using naturally derived collagen.

The chemically synthesized peptide or the chemically synthesized gelatin means an artificially synthesized peptide or gelatin. The synthesis of a peptide such as gelatin may be solid phase synthesis or liquid phase synthesis, but is preferably solid phase synthesis. The solid phase synthesis of a peptide is well-known to those skilled in the art, and examples thereof include a fluorenyl-methoxy-carbonyl group (Fmoc group) synthesis method in which a Fmoc group is used for protection of an amino group, and a tert-butyl oxy carbonyl group (Boc group) synthesis method in which a Boc group is used for protection of an amino group. As a preferred embodiment of the chemically synthesized gelatin, it is possible to apply the contents in (1-3) Recombinant Gelatin to be described below in the present specification.

The recombinant gelatin will be described below in the present specification.

A "1/IOB" value which is a hydrophilic value of biocompatible macromolecules used in the present invention is preferably within a range of 0 to 1.0, more preferably within a range of 0 to 0.6, and still more preferably within a range of 0 to 0.4. IOB is an index of hydrophilic and hydrophobic properties based on an organic conceptual diagram representing polarity and non-polarity of an organic compound proposed by Atsushi HUJITA, and the details thereof are described in, for example, "Pharmaceutical Bulletin", vol. 2, 2, pp. 163-173 (1954), "Area of Chemistry" vol. 11, 10, pp. 719-725 (1957), and "Fragrance Journal, vol. 50, pp. 79-82 (1981). Briefly, the root of every organic compound is set to methane ($CH_4$), and all of other compounds are regarded as derivatives of methane. Certain numerical values for the number of carbons thereof, a substituent group, a transformation portion, a ring, and the like are set, and an organic value (OV) and an inorganic value (IV) are obtained by adding the score thereof. These values are plotted on a diagram in which the organic value is shown on the X-axis and the inorganic value is shown on the Y-axis. IOB in the organic conceptual diagram refers to a ratio of the inorganic value (IV) to the organic value (OV) in the organic conceptual diagram, that is, "inorganic value (IV)/organic value (OV)". The details of the organic conceptual diagram can be referred to "New Edition Organic Conceptual Diagram—Foundation and Application—" (written by Yoshio KOUDA, Sankyo Shuppan Co., Ltd., 2008). In the present specification, the hydrophilic and hydrophobic properties are represented by a "1/IOB" value which was obtained by taking a reciprocal number of IOB. This is a notation of representing more hydrophilic properties as the "1/IOB" value becomes small (close to 0).

The hydrophilic properties and water absorbency become high by making the "1/IOB" value of the macromolecules used in the present invention be within the above-described range, which effectively acts to hold nutrient components.

In a case where the biocompatible macromolecules used in the present invention are polypeptides, the hydrophilic and hydrophobic indexes represented by a grand average of hydropathicity (GRAVY) value is preferably −9.0 to 0.3, and more preferably −7.0 to 0.0. The grand average of hydropathicity (GRAVY) value can be obtained through "Gasteiger E., Hoogland C., Gattiker A., Duvaud S., Wilkins M. R., Appel R. D., Bairoch A.; Protein Identification and Analysis Tools on the ExPASy Server; (In) John M. Walker (ed): The Proteomics Protocols Handbook, Humana Press (2005). pp. 571-607" and "Gasteiger E., Gattiker A., Hoogland C., Ivanyi I., Appel R. D., Bairoch A.; ExPASy: the proteomics server for in-depth protein knowledge and analysis.; Nucleic Acids Res. 31:3784-3788 (2003)". The hydrophilic properties and water absorbency become high by making the GRAVY value of the macromolecules used in the present invention be within the above-described range, which effectively acts to hold nutrient components.

(1-2) Cross-Linking

The biocompatible macromolecules used in the present invention may be or may not be cross-linked, but are preferably cross-linked. By using the cross-linked biocompatible macromolecules, it is possible to obtain an effect of preventing instant decomposition during culturing in a medium and during transplantation into a living body. As general cross-linking methods, thermal cross-linking, cross-linking using aldehydes (for example, formaldehyde or glutaraldehyde), cross-linking using a condensation agent (carbodiimide, cyanamide, or the like), enzymatic cross-linking, photocrosslinking, ultraviolet cross-linking, a hydrophobic interaction, hydrogen bonding, an ionic interaction, and the like are known, it is also possible to use the above-described cross-linking methods in the present invention. As the cross-linking methods used in the present invention, thermal cross-linking, ultraviolet cross-linking, or enzymatic cross-linking is more preferable, and thermal cross-linking is particularly preferable.

In a case of performing cross-linking using an enzyme, there is no particular limitation as long as the enzyme has a cross-linking action between macromolecular materials. However, it is possible to perform cross-linking preferably using transglutaminase and laccase and most preferably using transglutaminase. Specific examples of protein to be subjected to enzymatic cross-linking using transglutaminase are not particularly limited as long as the protein has a lysine residue and a glutamine residue. Transglutaminase may be derived from a mammal or may be derived from a microorganism. Specific examples thereof include mammal-derived transglutaminase which has been sold as Activa series manufactured by Ajinomoto Co., Inc., and a reagent; guinea pig liver-derived transglutaminase manufactured by, for example, Oriental Yeast Co., Ltd., Upstate USA Inc., or Biodesign International, Inc.; goat-derived transglutaminase; rabbit-derived transglutaminase; and human-derived blood coagulation factors (Factor XIIIa: Haematologic Technologies, Inc).

The reaction temperature in a case of performing cross-linking (for example, thermal cross-linking) is not particularly limited as long as cross-linking can be performed, but is preferably −100° C. to 500° C., more preferably 0° C. to 300° C., still more preferably 50° C. to 300° C., still more preferably 100° C. to 250° C., and still more preferably 120° C. to 200° C. However, T[Kelvin: K] is t[Celsius degree: ° C.]+273.15.

(1-3) Recombinant Gelatin

The recombinant gelatin referred in the present invention means polypeptides or protein-like substances which have an amino acid sequence similar to that of gelatin produced through gene recombination technology. The recombinant gelatin which can be used in the present invention preferably has a repetition of a sequence (X and Y each independently show any amino acids) represented by Gly-X-Y which is characteristic to collagen. Here, a plurality of pieces of Gly-X-Y may be the same as or different from each other. Preferably, two or more sequences of cell adhesion signals are included in one molecule. As the recombinant gelatin used in the present invention, it is possible to use recombinant gelatin having an amino acid sequence derived from a partial amino acid sequence of collagen, and to use recombinant gelatin disclosed in, for example, EP1014176A2, U.S. Pat. No. 6,992,172B, WO2004/85473A, and WO2008/103041A. However, the recombinant gelatin is not limited thereto. Preferred recombinant gelatin used in the present invention is recombinant gelatin of the following aspect.

The recombinant gelatin is excellent in biocompatibility with original performance of natural gelatin, and is excellent in non-infection properties since there is no concern of bovine spongiform encephalopathy (BSE) and the recombinant gelatin with not being naturally derived. In addition, the recombinant gelatin is even compared to natural gelatin, and a sequence is determined. Therefore, it is possible to accurately design the strength and degradability so as to reduce deviation through cross-linking or the like.

The molecular weight of recombinant gelatin is not particularly limited, but is preferably 2,000 to 100,000 (2 kDa to 100 kDa), more preferably (2,500 to 95,000 (2.5 kDa to 95 kDa), still more preferably 5,000 to 90,000 (5 kDa to 90 kDa), and most preferably 10,000 to 90,000 (10 kDa to 90 kDa).

The recombinant gelatin preferably has a repetition of a sequence represented by Gly-X-Y which is characteristic to collagen. Here, a plurality of pieces of Gly-X-Y may be the same as or different from each other. In Gly-X-Y, Gly represents glycine and X and Y represent an arbitrary amino acid (preferably represents an arbitrary amino acid other than glycine). The sequence represented by Gly-X-Y characteristic to collagen is a partial structure which is extremely specific compared to other protein in a composition or a sequence of an amino acid of gelatin/collagen. In this section, glycine occupies about one third of the entirety of the amino acid sequence, one sequence is repeated every three sequences. Glycine is the simplest amino acid. Therefore, there is a little restraint in arrangement of molecular chains and glycine significantly contributes to regeneration of a helix structure during gelation. It is preferable that amino acids represented by X and Y contain many imino acids (proline and oxyproline) and occupy 10% to 45% of the entirety of the sequence. Preferably 80% or more of the sequence of the amino acids, more preferably 95% or more of the sequence of the amino acids, and most preferably 99% or more of the sequence of the amino acids in the recombinant gelatin has a repeating structure of Gly-X-Y.

In general gelatin, a polar amino acid with an electrical charge and a polar non-charged amino acid exist by 1:1 in polar amino acids. Here, the polar amino acid specifically indicates cysteine, aspartic acid, glutamic acid, histidine, lysine, asparagine, glutamine, serine, threonine, tyrosine, or arginine. Among these, the polar non-charged amino acid indicates cysteine, asparagine, glutamine, serine, threonine, or tyrosine. In recombinant gelatin used in the present invention, the proportion of the polar amino acid in the whole constituent amino acid is 10% to 40% and preferably 20% to 30%. It is preferable that the proportion of a non-charged amino acid in the polar amino acid is greater than or equal to 5% and less than 20% and preferably less than 10%. Furthermore, it is preferable that any one amino acid or preferably two or more amino acids among serine, threonine, asparagine, tyrosine, and cysteine are not contained on a sequence.

In general, in polypeptides, minimum amino acid sequences which work as cell adhesion signals are known (for example, Nagai Shoten Co., Ltd., "Pathophysiology", Vol. 9, No. 7 (1990) p. 527). The recombinant gelatin used in the present invention preferably has two or more these cell adhesion signals in one molecule. As the specific sequences, sequences such as an RGD sequence, an LDV sequence, an REDV sequence (SEQ ID No: 2), a YIGSR sequence (SEQ ID No: 3), a PDSGR sequence (SEQ ID No: 4), an RYVVLPR sequence (SEQ ID No: 5), an LGTIPG sequence (SEQ ID No: 6), an RNIAEIIKDI sequence (SEQ ID No: 7), an IKVAV sequence (SEQ ID No: 8), an LRE sequence, a DGEA sequence (SEQ ID No: 9), and a HAV sequence, which are represented by one-letter notation of amino acids are preferable in that there are many kinds of cells adhered. An RGD sequence, a YIGSR sequence (SEQ ID No: 3), a PDSGR sequence (SEQ ID No: 4), an LGTIPG sequence (SEQ ID No: 6), an IKVAV sequence (SEQ ID No: 8), and a HAV sequence are more preferable and an RGD sequence is particularly preferable. In the RGD sequence, an ERGD sequence (SEQ ID No: 10) is preferable. It is possible to improve the production amount of substrate of a cell using recombinant gelatin having cell adhesion signals. For example, it is possible to improve the production of glycosaminoglycan (GAG) in a case of cartilage differentiation using mesenchymal stem cells as cells.

As arrangement of RGD sequences in recombinant gelatin used in the present invention, it is preferable that the number of amino acids between RGDs is between 0 to 100 and preferably between 25 to 60 without being even.

The content of this minimum amino acid sequence is preferably 3 to 50, more preferably 4 to 30, and particularly preferably 5 to 20 in one molecule of protein in view of cell adhesion properties and proliferation properties. The most preferable content thereof is 12.

In recombinant gelatin used in the present invention, the proportion of RGD motifs with respect to the total number of amino acids is preferably at least 0.4%. In a case where recombinant gelatin contains 350 or more amino acids, each stretch of the 350 amino acids preferably contains at least one RGD motif. The proportion of RGD motifs with respect to the total number of amino acids is still more preferably at least 0.6%, still more preferably at least 0.8%, still more preferably at least 1.0%, still more preferably at least 1.2%, and most preferably at least 1.5%. The number of RGD motifs within a recombinant peptide is, per 250 amino acids, preferably at least 4, still more preferably 6, still more preferably 8, and still more preferably 12 to 16. The proportion of RGD motifs being 0.4% corresponds to at least one RGD sequence per 250 amino acids. The number of RGD motifs is an integer, and therefore, gelatin formed of 251 amino acids needs to contain at least two RGD sequences in order to satisfy the characteristics of 0.4%. It is preferable that the recombinant gelatin of the present invention contains at least two RGD sequences per 250 amino acids, more preferably contains at least three RGD sequences per 250 amino acids, and still more preferably contains at least four RGD sequences per 250 amino acids. As a further mode of the recombinant gelatin of the present invention, the recombinant gelatin contains at least four RGD motifs, preferably 6 RGD motifs, more preferably 8 RGD motifs, and still more preferably 12 to 16 RGD motifs.

In addition, the recombinant gelatin may be partially hydrolyzed.

The recombinant gelatin used in the present invention is preferably represented by Formula 1: A-[(Gly-X-Y)$_n$]$_m$—B. n pieces of X each independently represent any amino acid and n pieces of Y each independently represent any amino acid. m preferably represents an integer of 2 to 10 and more preferably represents an integer of 3 to 5. n is preferably an integer of 3 to 100, more preferably an integer of 15 to 70, and most preferably an integer of 50 to 65. A represents an arbitrary amino acid or an amino acid sequence, B represents an arbitrary amino acid or an amino acid sequence. n pieces of Gly-X-Y may be the same as or different from each other.

More preferably, the recombinant gelatin used in the present invention is represented by Formula: Gly-Ala-Pro-[(Gly-X-Y)$_{63}$]3-Gly (where 63 pieces of X each independently represent any amino acid and 63 pieces of Y each independently represent any amino acid. 63 pieces of Gly-X-Y may be the same as or different from each other) and SEQ ID No: 11.

It is preferable that a plurality of sequence units of collagen which naturally exists are bonded to a repeating unit. Any naturally existing collagen referred to herein may be used as long as the collagen naturally exists, but is preferably I type collagen, II type collagen, III type collagen, IV type collagen, or V type collagen, and more preferably I type collagen, II type collagen, or III type collagen. According to another form, the above-described collagen is preferably derived from a human, cattle, a pig, a mouse, or a rat, and is more preferably derived from a human.

An isoelectric point of the recombinant gelatin used in the present invention is preferably 5 to 10, more preferably 6 to 10, and still more preferably 7 to 9.5. The measurement of the isoelectric point of the recombinant gelatin can be carried out by measuring the pH after passing a 1 mass % gelatin solution through a mixed crystal column of a cation-anion exchange resin above-described disclosed in isoelectric focusing method (refer to Maxey, C. R. (1976; Phitogr. Gelatin 2, Editor Cox, P. J. Academic, London, Engl.)).

It is preferable that the recombinant gelatin is not deaminated.

It is preferable that the recombinant gelatin does not have a telopeptide.

It is preferable that the recombinant gelatin is a substantially pure polypeptide which is prepared using a nucleic acid encoding an amino acid sequence.

It is particularly preferable that the recombinant gelatin used in the present invention is any of
 (1) a peptide formed of an amino acid sequence described in SEQ ID No: 1;
 (2) a peptide which is formed of an amino acid sequence in which one or a plurality of amino acids are deleted, substituted, or added in the amino acid sequence described in SEQ ID No: 1, and has biocompatibility; or
 (3) a peptide which is formed of an amino acid sequence having 80% or more (more preferably 90% or more, particularly preferably 95% or more, and most preferably 98% or more) sequence identity to the amino acid sequence described in SEQ ID No: 1, and has biocompatibility.

"One or a plurality of" in the "amino acid sequence in which one or a plurality of amino acids are deleted, substituted, or added" preferably means 1 to 20 amino acids, more preferably means 1 to 10 amino acids, still more preferably means 1 to 5 amino acids, and particularly preferably means 1 to 3 amino acids.

The recombinant gelatin used in the present invention can be produced through gene recombination technology which is known to those skilled in the art, and can be produced in accordance with, for example, methods disclosed in EP1014176A2, U.S. Pat. No. 6,992,172B, WO2004/85473A, and WO2008/103041A. Specifically, a gene encoding an amino acid sequence of predetermined recombinant gelatin is acquired, the acquired gene is incorporated into an expression vector to produce a recombinant expression vector, and a transformant is produced by introducing the recombinant expression vector into an appropriate host. The recombinant gelatin is produced by culturing the obtained transformant in an appropriate medium. Therefore, it is possible to prepare the recombinant gelatin used in the present invention by collecting the recombinant gelatin produced from a culture product.

(1-4) Biocompatible Macromolecular Block

In the present invention, a block (aggregation) formed of the above-described biocompatible macromolecules is used.

The shape of the biocompatible macromolecular block in the present invention is not particularly limited. Examples thereof include an amorphous shape, a spherical shape, a particulate shape (granule), a powdery shape, a porous shape, a fibrous shape, a spindle shape, a flat shape, and a sheet shape. An amorphous shape, a spherical shape, a particulate shape (granule), a powdery shape, and a porous shape are preferable. The amorphous shape indicates that the shape of a surface is uneven, and indicates, for example, an object, such as rock, which has roughness. Examples of the above-described shapes are not distinct from each other. For example, in some cases, an example of a subordinate concept of the particulate shape (granule) is an amorphous shape.

The size of one biocompatible macromolecular block in the present invention is not particularly limited, but is preferably 1 μm to 700 μm, more preferably 10 μm to 700 μm, still more preferably 10 μm to 300 μm, still more preferably 20 μm to 200 μm, still more preferably 20 μm to 150 μm, and particularly preferably 53 μm to 106 μm. It is possible to favorably deliver nutrients into a cell structure from the outside by setting the size of one biocompatible macromolecular block to be within the above-described range. The size of one biocompatible macromolecular block does not mean that an average value of the sizes of a plurality of biocompatible macromolecular blocks is within the above-described range, but means the size of each biocompatible macromolecular block which is obtained by sieving a plurality of biocompatible macromolecular blocks.

The size of one block can be defined by the size of a sieve used in a case of dividing the block. For example, blocks remaining on a sieve with 106 μm in a case where blocks which have been passed through a sieve with 180 μm for sifting are sifted using the sieve with 106 μm can be regarded as blocks having a size of 106 to 180 μm. Next, blocks remaining on a sieve with 53 μm in a case where blocks which have been passed through the sieve with 106 μm for sifting are sifted using the sieve with 53 μm can be regarded as blocks having a size of 53 to 106 μm. Next, blocks remaining on a sieve with 25 μm in a case where blocks which have been passed through the sieve with 53 μm for sifting are sifted using the sieve with 25 μm can be regarded as blocks having a size of 25 to 53 μm.

(1-5) Method for Producing Biocompatible Macromolecular Block

The method for producing a biocompatible macromolecular block is not particularly limited. For example, it is possible to obtain a biocompatible macromolecular block by pulverizing a solid matter (such as a porous body of a biocompatible macromolecule) containing a biocompatible macromolecule using a pulverizer (such as NEW POWER-MILL). The solid matter (such as a porous body of a biocompatible macromolecule) containing a biocompatible macromolecule can be obtained, for example, by freeze-drying an aqueous solution containing the biocompatible macromolecule.

It is possible to produce an amorphous biocompatible macromolecular block of which the shape of the surface is uneven, by pulverizing a solid matter containing a biocompatible macromolecule as described above.

An example of the method for producing a porous body of a biocompatible macromolecule include a method including
 (a) a step of cooling a solution of biocompatible macromolecules under the conditions where the difference between the temperature of a portion having the highest liquid temperature within the solution and the temperature of a portion having the lowest liquid temperature within the solution is lower than or equal to 2.5° C. and the temperature of a portion having the highest liquid temperature within the solution is lower than or equal to a melting point, to an unfrozen state,
 (b) a step of freezing the solution of the biocompatible macromolecules obtained in the step (a), and
 (c) a step of freeze-drying the frozen biocompatible macromolecules obtained in the step (b).

In a case where the solution of the biocompatible macromolecules is cooled to an unfrozen state, the variation in the size of pores of an obtained porous body is reduced by making the difference between the temperature of a portion having the highest liquid temperature and the temperature of a portion having the lowest liquid temperature within the solution be lower than or equal to 2.5° C. (preferably lower than or equal to 2.3° C. and more preferably lower than or equal to 2.1° C.), that is, by reducing the difference in temperature. The lower limit of the difference between the temperature of a portion having the highest liquid temperature and the temperature of a portion having the lowest liquid temperature within the solution is not particularly limited, but may be higher than or equal to 0° C. For example, the lower limit thereof may be higher than or equal to 0.1° C., higher than or equal to 0.5° C., higher than or equal to 0.8° C., or higher than or equal to 0.9° C.

The cooling in the step (a) is preferably carried out, for example, using a material (preferably TEFLON (registered trademark)) having a lower thermal conductivity than water. The portion having the highest liquid temperature within the solution can be supposed as the farthest portion from a cooling side, and the portion having the lowest liquid temperature within the solution can be supposed as a liquid temperature of the cooling surface.

In the step (a), the difference between the temperature of a portion having the highest liquid temperature within the solution and the temperature of a portion having the lowest liquid temperature within the solution immediately before generation of solidification heat is preferably lower than or equal to 2.5° C., more preferably lower than or equal to 2.3° C., and still more preferably lower than or equal to 2.1° C. Here, the "difference in temperature immediately before the generation of solidification heat" means a difference in temperature in a case where the difference in temperature becomes largest between 1 second and 10 seconds before the generation of solidification heat.

In the step (a), the temperature of a portion having the lowest liquid temperature within the solution is preferably lower than or equal to a melting point of a solvent −5° C., more preferably lower than or equal to a melting point of a solvent −5° C. and higher than or equal to a melting point of a solvent −20° C., and still more preferably lower than or equal to a melting point of a solvent −6° C. and higher than or equal to a melting point of a solvent −16° C. The solvent of a melting point of a solvent is a solvent of a solution of biocompatible macromolecules.

In the step (b), the solution of the biocompatible macromolecules obtained in the step (a) is frozen. The cooling temperature for the freezing in the step (b) is not particularly limited. Depending on cooling equipments, the cooling temperature is preferably a temperature which is 3° C. to 30° C. lower than the temperature of a portion having the lowest liquid temperature within the solution, more preferably a temperature which is 5° C. to 25° C. lower than the temperature of a portion having the lowest liquid temperature within the solution, and still more preferably a temperature which is 10° C. to 20° C. lower than the temperature of a portion having the lowest liquid temperature within the solution.

In the step (c), the frozen biocompatible macromolecules obtained in the step (b) are freeze-dried. The freeze-drying can be performed through a usual method. For example, the freeze-drying can be performed by carrying out vacuum drying at a temperature lower than a melting point of a solvent and further carrying out vacuum drying at room temperature (20° C.).

In the present invention, a biocompatible macromolecular block can be preferably produced by pulverizing the porous body obtained in the above-described step (c).

(2) Cell

The cell structure of the present invention contains at least a cancer cell and a mesenchymal cell.

Specific examples of cancer from which cancer cells are derived include malignant melanoma, malignant lymphoma, gastrointestinal cancer, lung cancer, esophageal cancer, stomach cancer, colorectal cancer, rectum cancer, colon carcinoma, urinary tract tumor, gallbladder cancer, bile duct cancer, biliary tract cancer, breast cancer, liver cancer, pancreatic cancer, testicular tumor, maxillary cancer, tongue cancer, lip cancer, mouth cancer, pharyngeal cancer, laryngeal cancer, ovary cancer, uterine cancer, prostate cancer, thyroid cancer, brain tumor, Kaposi's sarcoma, hemangioma, leukemia, polycythemia vera, neuroblastoma, retinoblastoma, myeloma, bladder tumor, sarcoma, osteosarcoma, myosarcoma, skin cancer, basal cell carcinoma, skin appendage cancer, and skin metastatic cancer, but the present invention is not limited thereto. An example of the cancer cells includes a pancreatic cancer cell.

The cancer cells used in the present invention may be any one of an established cancer cell and an unestablished cancer cell, but is preferably an established cancer cell.

The established cancer cell is a cell which is collected from a living body and is in a state where it is possible to perform almost indefinite proliferation in a case where culturing is performed under appropriate culture conditions. The appropriate culture conditions referred to herein is conditions under which temperature, nutrients, proliferation factors, adhesion surfaces, and the like are provided in accordance with each cell. Examples of the unestablished cancer cell include primary culture cells obtained by initially seeding and culturing tissue or cells collected from a living body.

The kind of cancer cell used in the present invention may be one or more kinds, preferably one or two kinds, and more preferably one kind.

The mesenchymal cells mean connective tissue cells such as osteocytes, chondrocytes, muscle cells, tendon cells, adipocytes, hair papilla cells, and dental pulp cells, and cells having an ability to be differentiated into the above-described cells. Specific examples thereof include fibroblasts, hair papilla cells, adipocytes, and dental pulp cells. Examples of tissue in which mesenchymal cells present include bone, cartilage, muscle, tendon, adipose tissue, hair papilla, and dental pulp. Mesenchymal cells also exist inside and around the real organs such as blood vessels, the liver, or the pancreas and in bone marrow or the umbilical cord. Mesenchymal stem cells exist in bone marrow as cells having pluripotency to many connective tissue cells. In the present invention, mesenchymal stem cells can be preferably used. Mesenchymal cells can be obtained by extracting target tissue from an animal and performing separation culture.

The type of mesenchymal cell used in the present invention may be one or more kinds, preferably one or two kinds, and more preferably one kind.

The ratio of the number of cells of the cancer cell to the mesenchymal cell in the cell structure of the present invention is not particularly limited, but is preferably 10:1 to 1:10, more preferably 5:1 to 1:5, and still more preferably 2:1 to 1:2.

The cell structure of the present invention may contain other cells in addition to the cancer cell and the mesenchymal cell. Examples of the other cells include vascular endothelial cells, embryonic stem (ES) cells, induced pluripotent stem (iPS) cells, stromal cells, line fibroblasts, adipose-derived stem cells, and umbilical cord-derived stem cells, but are not particularly limited thereto.

Confirmation whether a cell is a predetermined cell described above can be performed by checking whether the target cell has a function of each cell. Alternately, the confirmation can also be performed by checking whether the target cell expresses a marker specific to each cell. However, the present invention is not particularly limited thereto.

Each of the above-described cells used in the present invention means the broadest range of each term, and may be any of cells collected from a living body, cells obtained by subjecting the cells collected from a living body to an operation (such as a gene transfer operation), and cells (for example, cells which have been differentiated and induced from iPS cells) obtained by transition from other cells.

Cells to be used are preferably animal cells, more preferably vertebrate animal-derived cells, and particularly preferably human-derived cells.

(3) Cell Structure

In the present invention, the cell structure can have a thickness suitable for cell transplantation by three-dimensionally arranging a plurality of biocompatible macromolecular blocks in gaps between a plurality of cells in a mosaic shape using the biocompatible macromolecular blocks, the cancer cells, and the mesenchymal cells. Furthermore, a cell structure in which cells evenly exist in the structure is formed by three-dimensionally arranging the biocompatible macromolecular blocks and the cells in a mosaic shape, and it is possible to deliver nutrients to the inside of the cell structure from the outside.

In the cell structure of the present invention, the plurality of biocompatible macromolecular blocks are arranged in gaps between the plurality of cells. Here, the "gaps between cells" is not necessarily a space closed by the constituent cells, and may be interposed by the cells. Gaps are not necessarily present between all of the cells, and there may be a place where cells are brought into contact with each other. The distance of gaps between cells through biocompatible macromolecular blocks, that is, the gap distance in a case of selecting a certain cell, and a cell existing in a shortest distance from the certain cell is not particularly limited. However, the distance is preferably the size of a biocompatible macromolecular block, and a favorable distance is also within the range of the favorable size of a biocompatible macromolecular block.

In addition, the biocompatible macromolecular blocks have a configuration of being interposed by the cells. However, there are not necessarily cells between all of the biocompatible macromolecular blocks, and there may be a place where biocompatible macromolecular blocks are brought into contact with each other. The distance between biocompatible macromolecular blocks through cells, that is, the distance in a case of selecting a biocompatible macromolecular block, and a biocompatible macromolecular block existing in a shortest distance from the biocompatible macromolecular block is not particularly limited. However, the distance is preferably the size of an aggregation of cells in a case where one or several cells to be used are gathered. For example, the size thereof is 10 μm to 1,000 μm, preferably 10 μm to 100 μm, and more preferably 10 μm to 50 μm.

The expressions such as "evenly exist", for example, the "cell structure in which cells evenly exist in the structure" is used in the present specification. However, the expression does not mean complete evenness, but means that it is possible to deliver nutrients to the inside of the cell structure from the outside.

The thickness or the diameter of the cell structure in the present invention can be set to a desired thickness. As the lower limit, being greater than or equal to 215 μm is preferable, being greater than or equal to 400 μm is more preferable, and being greater than or equal to 730 μm is most preferable. The upper limit of the thickness or the diameter is not particularly limited, but a general range in use is preferably less than or equal to 3 cm, more preferably less than or equal to 2 cm, and still more preferably less than or equal to 1 cm. In addition, the range of the thickness or the diameter of the cell structure is preferably 400 μm to 3 cm, more preferably 500 μm to 2 cm, and still more preferably 720 μm to 1 cm. By setting the thickness or the diameter of the cell structure to be within the above-described range, it is possible to favorably deliver nutrients into the cell structure from the outside.

In the cell structure of the present invention, a region formed of biocompatible macromolecular blocks and a region formed of cells are preferably arranged in a mosaic shape. The "thickness or the diameter of cell structure" in the present specification indicates the following. In a case of selecting a certain point A in the cell structure, the length of a line segment which divides the cell structure is set as a line segment A such that the distance from the external boundary of the cell structure becomes shortest within a straight line passing through the point A. A point A at which the line segment A thereof in the cell structure becomes longest is selected, and the length of the line segment A during the selection thereof is set as the "thickness or the diameter of the cell structure".

In the cell structure in the present invention, the ratio of a biocompatible macromolecular block to a cell is not particularly limited. However, it is preferable that the ratio of a biocompatible macromolecular block per cell is preferably 0.0000001 µg to 1 µg, more preferably 0.000001 µg to 0.1 µg, still more preferably 0.00001 µg to 0.01 µg, and most preferably 0.00002 µg to 0.006 µg. By setting the ratio of the biocompatible macromolecular blocks to the cells to be within the above-described range, it is possible to make the cells more evenly exist. By setting the lower limit to be within the above-described range, it is possible to exhibit an effect of the cells in a case of using the cells for a desired purpose. Moreover, by setting the upper limit to be within the above-described range, it is possible to supply components in arbitrarily existing biocompatible macromolecular blocks to cells. Here, the components in biocompatible macromolecular blocks are not particularly limited, but examples thereof include components contained in a medium to be described below.

(4) Method for Producing Cell Structure

The cell structure of the present invention can be produced by mixing a biocompatible macromolecular block with a cancer cell and a mesenchymal cell. More specifically, the cell structure of the present invention can be produced by alternately arranging a biocompatible macromolecular block and the above-described cell. The production method is not particularly limited, but is preferably a method for forming a biocompatible macromolecular block, and then, mixing the biocompatible macromolecular block with the cells. Specifically, it is possible to produce the cell structure of the present invention by incubating a mixture of a biocompatible macromolecular block and a culture solution containing a cancer cell and a mesenchymal cell. The ratio of the number of cells of the cancer cell to the mesenchymal cell in the culture solution containing t a cancer cell and a mesenchymal cell is not particularly limited, but is preferably 10:1 to 1:10, more preferably 5:1 to 1:5, and still more preferably 2:1 to 1:2.

In the present invention, for example, in a liquid held by a container, a cell and a biocompatible macromolecular block which has been prepared in advance can be arranged in a mosaic shape in the container. It is preferable to promote or control the formation of a cell structure formed of a cell and a biocompatible macromolecular block through natural aggregation, natural fall, centrifugation, or agitation as means for the arrangement.

As the container to be used, a container formed of a low-adhesive cell material or a non-adhesive cell material is preferable and a container formed of polystyrene, polypropylene, polyethylene, glass, polycarbonate, or polyethylene terephthalate is more preferable. The shape of the bottom surface of a container is preferably a flat bottom shape, a U-shape, and a V-shape.

In the cell structure (mosaic cell aggregation) obtained through the above-described method, the cell structure having a desired size may be produced through a method, for example, (a) merging cell structures (mosaic cell aggregations), which have been separately prepared, with each other, or (b) increasing the volume of the structure under a differentiation medium or a proliferation medium.

The method for merging the cell structures with each other or the method for increasing the volume of the cell structure is not particularly limited.

For example, it is possible to increase the volume of the cell structure by exchanging a medium with a differentiation medium or a proliferation medium in a step of incubating a mixture of a biocompatible macromolecular block and a cell-containing culture solution. Preferably, it is possible to produce a cell structure in which cells evenly exist and which has a desired size, by further adding a biocompatible macromolecular block, in the step of incubating a mixture of a biocompatible macromolecular block and a cell-containing culture solution.

In a case where cell structures which have been separately prepared are merged with each other, it is possible to, for example, merge a plurality of cell structures which contains a plurality of biocompatible macromolecular blocks and a plurality of cells and in which one or a plurality of the above-described biocompatible macromolecular blocks are arranged in some or all of a plurality of gaps formed by the plurality of the above-described cells. A cell structure obtained by merging a plurality of cell structures of the present invention with each other as described in the above-described (a) is also within the scope of the present invention.

Preferred ranges of "(the kind, the size, or the like of) biocompatible macromolecular block", the "cell", the "gap between cells", "(the size or the like) of an obtained cell structure", the "ratio of a cell to a biocompatible macromolecular block", and the like according to the method for producing a cell structure of the present invention are the same as those described above in the present specification.

The thickness or the diameter of each cell structure before the above-described merging is preferably 10 µm to 1 cm, more preferably 10 µm to 2000 µm, still more preferably 15 µm to 1500 µm, and most preferably 20 µm to 1300 µm. The thickness or the diameter thereof after the merging is preferably 400 µm to 3 cm, more preferably 500 µm to 2 cm, and still more preferably 720 µm to 1 cm.

A specific example of the above-described method for producing a cell structure with a desired size by further adding a biocompatible macromolecular block includes a method for performing incubation by further adding a second biocompatible macromolecular block to a cell structure which contains a plurality of first biocompatible macromolecular blocks and a plurality of cells and in which one or a plurality of the above-described biocompatible macromolecular blocks are arranged in some or all of a plurality of gaps formed by the plurality of the above-described cells. Here, preferred ranges of "(the kind, the size, or the like of) biocompatible macromolecular block", the "cell", the "gap between cells", "(the size or the like) of an obtained cell structure", the "ratio of a cell to a biocompatible macromolecular block", and the like according to the method for producing a cell structure of the present invention are the same as those described above in the present specification.

Cell structures to be merged are preferably arranged at a distance of 0 to 50 µm, more preferably arranged at a distance of 0 to 20 µm, and still more preferably at a distance of 0 to 5 µm. In a case of merging the cell structures, it is considered that cells or substrates produced by the cells play a role as an adhesive through proliferation and extension of cells, thereby bonding the cell structures to each other. By setting the distance between the cell structures to be within the above-described range, the adhesion between the cell structures becomes easy.

The range of the thickness or the diameter of the cell structure obtained through the method for producing a cell structure of the present invention is preferably 400 µm to 3 cm, more preferably 500 µm to 2 cm, and still more preferably 720 µm to 1 cm.

The pace at which the second biocompatible macromolecular block is added to a cell structure in the case of performing incubation by further adding the second biocompatible macromolecular block to the cell structure is appropriately selected in accordance with the proliferation rate of cells to be used. Specifically, in a case where the pace at which the second biocompatible macromolecular block is added is fast, the cells move outside the cell structure, and therefore, the uniformity of the cells is deteriorated. In a case where the pace of the addition is slow, a place where the proportion of the cells increases is generated, and therefore, the uniformity of the cells is deteriorated. Thus, the pace of the addition is selected in consideration of the proliferation rate of cells to be used.

(5) Non-Human Model Animal and Method for Producing the Same

The cell structure of the present invention can be transplanted into a non-human animal for producing a non-human model animal. A transplant for producing a non-human model animal including the cell structure of the present invention is contained in the present invention. Furthermore, according to the present invention, a non-human model animal for a cancer disease which has the above-described cell structure of the present invention as a transplant is provided.

The non-human model animal for a cancer disease means a model animal having cancer.

A cancer disease is preferably a human cancer disease.

Examples of the cancer disease include the diseases described above in the present specification in the "specific examples of cancer from which cancer cells are derived", but are not limited thereto.

The biocompatible macromolecular blocks, the cancer cells, and the mesenchymal cells constituting the cell structure, and the preferred range thereof are as described above in the present specification.

A site into which a cell structure in a non-human model animal is not particularly limited, but is, for example, under the skin, within the abdominal cavity, or in organs or tissue (preferably organs or tissue from which cancer cells to be transplanted are derived), and is preferably under the skin.

An animal into which a cell structure is to be transplanted is not particularly limited as long as the animal is non-human animals, but is preferably a mammal. Among mammals, rodents such as a mouse, a rat, a rabbit, or a hamster are preferable from the viewpoint of easy handling.

In addition, an animal with reduced immunity or an immunodeficient animal is preferably as the non-human animal. The non-human animal with reduced immunity may be any animal whose immunity has been lowered to the extent that the cell structure can be grafted. Examples thereof include immunodeficient animals such as a nude mouse, a nude rat, a severe combined immunodeficiency (SCID) mouse, a non-obese diabetic (NOD)-SCID mouse, and a hereditary lymph node-deficient (ALY) mouse, and a commercially available product can also be used. In order to reduce immunity, a non-human animal may be irradiated with radiation such as an X-ray. In a case where a non-human animal to be prepared is, for example, a mouse or a rat, it is possible to use a 4- to 12-week mouse or rat. The non-human animal can be raised in an environment in which infection is prevented in accordance with the degree of reduced immunity. Antibiotics may be administered to the non-human animal for the purpose of preventing the infection.

According to the present invention, a method for producing a non-human model animal for a cancer disease which includes transplanting the above-described cell structure of the present invention into a non-human animal is provided.

As the method for transplanting a cell structure, it is possible to use incision and injection, and a method using an endoscope.

A cell structure can be transplanted into a transplantation site in a state of being suspended in a medium (for example, MSCGM BulletKit™ manufactured by Lonza) or phosphate-buffered saline (PBS).

1 to 1,000 cell structures, preferably 1 to 100 cell structures can be transplanted into a non-human animal.

Since the cell structure of the present invention contains a cancer cell, it is possible to form cancer in a non-human animal by transplanting the cell structure of the present invention into the above-described non-human animal.

The non-human model animal of the present invention is useful for development of a cancer remedy, verification of a cancer therapeutic effect, verification of side effects due to cancer treatment, development of a reagent for detecting and imaging cancer, and the like.

(6) Method for Evaluating Test Substance

According to the present invention, a method for evaluating a test substance which includes administering a test substance to the above-described non-human model animal of the present invention is provided. In a case where a candidate substance of a cancer remedy such as an anticancer agent is used as a test substance, a cancer remedy can be screened.

The method for evaluating a test substance according to the present invention preferably includes: a step of administering a test substance to a non-human model animal of the present invention; and a step of evaluating the pathological condition of cancer in the above-described non-human model animal.

The test substance is not particularly limited, and can be appropriately selected in accordance with the purpose, and examples thereof include compounds such as organic low-molecular compounds, peptides, proteins, antibodies, nucleic acids, carbohydrates, lipids, cell extracts, cell culture supernatants, plant extracts, and microbial products. Each library of compounds, peptides, proteins, and antibodies can be used. For example, a library of compounds produced using a combinatorial chemistry technique, a random peptide library or an antibody library which is selected through solid phase synthesis or a phage display method, and the like can be used.

The administration route of a test substance may include oral administration or parenteral administration. Examples of the parenteral administration include systemic administration such as intravenous, intraarterial, or intramuscular administration and local administration. The dose, the administration interval, the administration start time, and the administration period of a test substance are not particularly limited, but can be appropriately selected depending on the purpose and in accordance with the kind of non-human animal to be administered, the kind of test substance, and the like.

In the step of evaluating the pathological condition of cancer in a non-human model animal, a test substance capable of reducing cancer (tumor) or controlling an increase of cancer (tumor) can be selected as a candidate substance of a cancer remedy. The reduction of cancer (tumor) or the control of the increase of cancer (tumor) can be evaluated by measuring the size (volume or the like) of cancer (tumor). Alternately, in the step of evaluating the pathological condition of cancer in a non-human model animal, a symptom caused by cancer or a numerical value of a cancer-related marker may be used as an index.

In addition, the evaluation of the pathological condition of cancer in a non-human model animal can be performed using a non-human model animal into which a test substance has not been administered as a negative control.

The test substance selected as described above can be a candidate for a cancer remedy.

The present invention will be more specifically described using the following examples, but is not limited by the examples.

EXAMPLES

[Example 1] Recombinant Peptide (Recombinant Gelatin)

The following CBE3 (which is disclosed in WO2008/103041A) was prepared as recombinant peptides (recombinant gelatin).

CBE3:
Molecular weight: 51.6 kD
Structure: GAP[(GXY)$_{63}$]$_3$G (SEQ ID No: 11)
Number of amino acids: 571
RGD sequence: 12
Imino acid content: 33%

Almost 100% of amino acids have a repeating structure of GXY. In the amino acid sequence of CBE3, serine, threonine, asparagine, tyrosine, and cysteine are not included. CBE3 has an ERGD sequence (SEQ ID No: 10).

Isoelectric point: 9.34
GRAVY value: −0.682
1/IOB value: 0.323

Amino acid sequence (SEQ ID No: 1 in a sequence table) (which is the same as that of SEQ ID No: 3 in WO2008/103041A. However, X in the end is corrected to "P").

```
GAP(GAPGLQGAPGLQGMPGERGAAGLPGPKGERGDAGPKGADGAPGAPG

LQGMPGERGAAGLPGPKGERGDAGPKGADGAPGKDGVRGLAGPIGPPGER

GAAGLPGPKGERGDAGPKGADGAPGKDGVRGLAGPIGPPGPAGAPGAPGL

QGMPGERGAAGLPGPKGERGDAGPKGADGAPGKDGVRGLAGPP)₃G
```

[Example 2] Production of Porous Body of Recombinant Peptide

[PTFE Thickness•Cylindrical Container]

A cylindrical cup-shaped polytetrafluoroethylene (PTFE) container with a bottom surface thickness of 3 mm, a diameter of 51 mm, a side surface thickness of 8 mm, and a height of 25 mm was prepared. In a case where the curved surface of the cylindrical cup is set as a side surface, the side surface is closed by PTFE with 8 mm and the bottom surface (circular shape of a flat plate) is also closed by PTFE with 3 mm. In contrast, the upper surface is in an open shape. Accordingly, the inner diameter of the cylindrical cup is set to 43 mm. Hereinafter, this container is referred to as a PTFE thickness•cylindrical container.

[Aluminum Glass Plate•Cylindrical Container] A cylindrical cup-shaped aluminum container with a thickness of 1 mm and a diameter of 47 mm was prepared. In a case where the curved surface of the cylindrical cup is set as a side surface, the side surface is closed by aluminum with 1 mm and the bottom surface (circular shape of a flat plate) is also closed by aluminum with 1 mm. In contrast, the upper surface is in an open shape. In addition, TEFLON (registered trademark) with a thickness of 1 mm is evenly spread only in the inside of the side surface, and as a result, the inner diameter of the cylindrical cup becomes 45 mm. In addition, the bottom surface of this container enters a state where a 2.2 mm glass plate is joined to the bottom surface thereof on the outside of aluminum. Hereinafter, this container is referred to as an aluminum glass•cylindrical container.

[Freezing Step in which Difference in Temperature is Small, and Drying Step]

An aqueous CBE3 solution was made to flow into the PTFE thickness•cylindrical container and the aluminum glass plate•cylindrical container, and was cooled down from the bottom surface within a vacuum freeze dryer (TF5-85ATNNN: Takara Co., Ltd.) using a cooling shelf. A combination of the setting of the final concentration of the aqueous CBE3 solutions in the containers at this time, the amount of solution, and the temperature of the shelf was prepared as described below.

Condition A:
PTFE thickness•cylindrical container, final concentration of aqueous CBE3 solution of 4 mass %, amount of aqueous solution of 4 mL. As the setting for the temperature of the shelf, the temperature was cooled down until the temperature reaches −10° C., and then, freezing was performed for 1 hour at −10° C., for 2 hours at −20° C., for 3 hours at −40° C., and finally for 1 hour at −50° C. Thereafter, the frozen product was subjected to vacuum drying for 24 hours at −20° C. after the setting of the temperature of the shelf was returned to −20° C. After 24 hours, the temperature of the shelf was increased to 20° C. in a state in which the vacuum drying was continued as it was, and the vacuum drying was further performed for 48 hours at 20° C. until the vacuum degree was sufficiently decreased (1.9×10$^5$ Pa). Then, the product was taken out of the vacuum freeze dryer. Accordingly, a porous body was obtained.

Condition B:
Aluminum•glass plate•cylindrical container, final concentration of aqueous CBE3 solution of 4 mass %, amount of aqueous solution of 4 mL. As the setting for the temperature of the shelf, the temperature was cooled down until the temperature reaches −10° C., and then, freezing was performed for 1 hour at −10° C., for 2 hours at −20° C., for 3 hours at −40° C., and finally for 1 hour at −50° C. Thereafter, the frozen product was subjected to vacuum drying for 24 hours at −20° C. after the setting of the temperature of the shelf was returned to −20° C. After 24 hours, the temperature of the shelf was increased to 20° C. in a state in which the vacuum drying was continued as it was, and the vacuum drying was further performed for 48 hours at 20° C. until the vacuum degree was sufficiently decreased (1.9×10$^5$ Pa).

Then, the product was taken out of the vacuum freeze dryer. Accordingly, a porous body was obtained.

Condition C:

PTFE thickness•cylindrical container, final concentration of aqueous CBE3 solution of 4 mass %, amount of aqueous solution of 10 mL. As the setting for the temperature of the shelf, the temperature was cooled down until the temperature reaches −10° C., and then, freezing was performed for 1 hour at −10° C., for 2 hours at −20° C., for 3 hours at −40° C., and finally for 1 hour at −50° C. Thereafter, the frozen product was subjected to vacuum drying for 24 hours at −20° C. after the setting of the temperature of the shelf was returned to −20° C. After 24 hours, the temperature of the shelf was increased to 20° C. in a state in which the vacuum drying was continued as it was, and the vacuum drying was further performed for 48 hours at 20° C. until the vacuum degree was sufficiently decreased ($1.9 \times 10^5$ Pa). Then, the product was taken out of the vacuum freeze dryer. Accordingly, a porous body was obtained.

[Measurement of Temperature in Each Freezing Step]

Regarding the conditions A to C, the liquid temperature of the surface of water in a center portion of a circle within a container was measured as the liquid temperature (non-cooled surface liquid temperature) of the farthest portion from a cooling side in a solution, and the liquid temperature of a bottom portion within the container was measured as the liquid temperature (cooled surface liquid temperature) of the closest portion to the cooling side in the solution.

Figure 2:
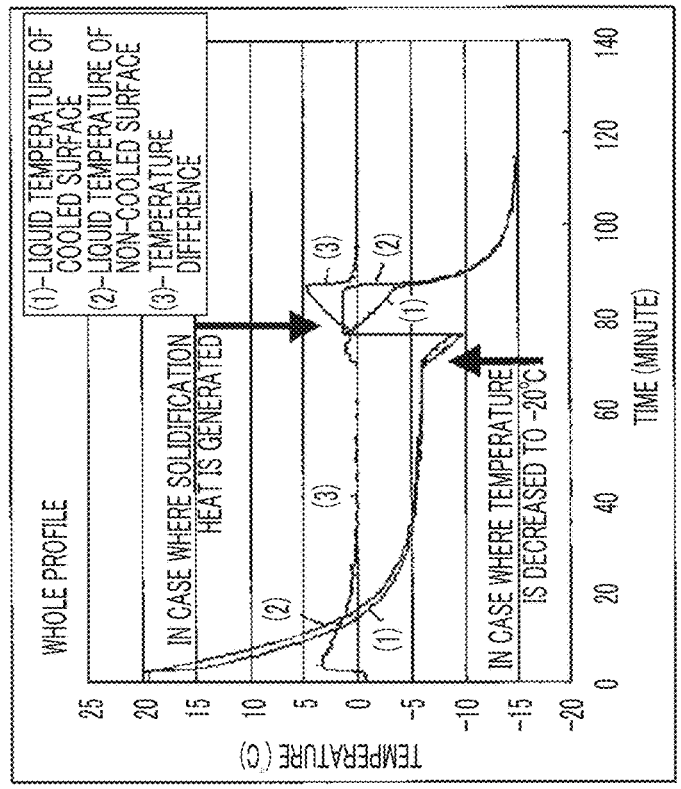
FIG. 2 shows a liquid temperature profile of a condition B of examples.
Figure 3:
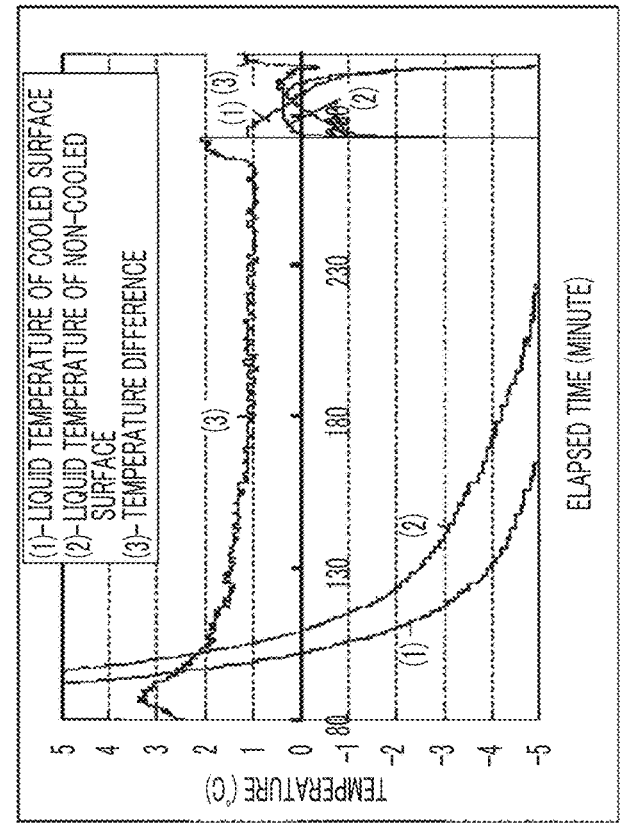
FIG. 3 shows a liquid temperature profile of a condition C of examples.
Figure 3:
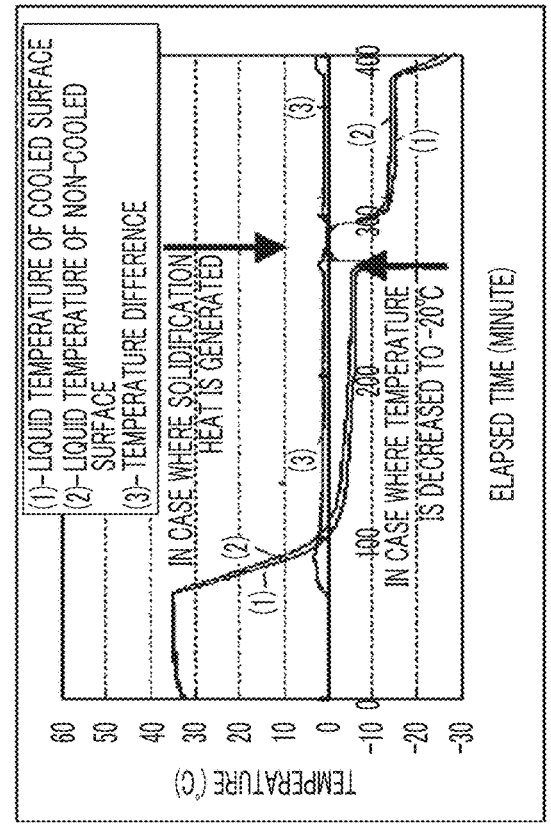

As a result, each temperature and a profile of the difference in temperature are as shown in FIGS. 1 to 3.

It can be seen from FIGS. 1 to 3 that the liquid temperature falls below 0° C., which is a melting point, in a setting section of the temperature of a shelf of −10° C. (before the temperature decreases to −20° C.) in the conditions A to C, and the solution enters a (unfrozen and overcooled) state where freezing does not occur in that state. In addition, in this state, the difference in temperature between the cooled surface liquid temperature and the non-cooled surface liquid temperature is less than or equal to 2.5° C. In the present specification, the "difference in temperature" means "non-cooled surface liquid temperature"-"cooled surface liquid temperature". Thereafter, the timing at which the liquid temperature rapidly rises to around 0° C. by further lowering the temperature of the shelf to −20° C. is confirmed. Here, it can be seen that freezing starts due to generation of solidification heat. In addition, it was also possible to confirm that ice formation actually started at the timing. Thereafter, the temperature was around 0° C. while the certain time passes. Here, the product entered a state where there was a mixture of water and ice. The temperature finally started to decrease again from 0° C. At this time, the liquid portion disappeared and became ice. Accordingly, the temperature being measured became a solid temperature within the ice, that is, was not the liquid temperature.

Hereinafter, regarding the conditions A to C, the difference in temperature at this time when the non-cooled surface liquid temperature became a melting point (0° C.), the difference in temperature immediately before the temperature of the shelf is decreased from −10° C. to −20° C., and the difference in temperature immediately before the generation of solidification heat will be described. The "difference in temperature immediately before" referred in the present invention indicates the highest temperature in the difference in temperature which can be detected between 1 second to 20 seconds before an event (such as the generation of solidification heat).

Condition A

Difference in temperature at this time when non-cooled surface liquid temperature became melting point (0° C.): 1.1° C.

Difference in temperature immediately before temperature is decreased from −10° C. to −20° C.: 0.2° C.

Difference in temperature immediately before generation of solidification heat: 1.1° C.

Condition B

Difference in temperature at this time when non-cooled surface liquid temperature became melting point (0° C.): 1.0° C.

Difference in temperature immediately before temperature is decreased from −10° C. to −20° C.: 0.1° C.

Difference in temperature immediately before generation of solidification heat: 0.9° C.

Condition C

Difference in temperature at this time when non-cooled surface liquid temperature became melting point (0° C.): 1.8° C.

Difference in temperature immediately before temperature is decreased from −10° C. to −20° C.: 1.1° C.

Difference in temperature immediately before generation of solidification heat: 2.1° C.

[Example 3] Production of Biocompatible Macromolecular Block (Pulverizing and Cross-Linking of Porous Body)

The CBE3 porous bodies which had been obtained in Example 2 were pulverized using NEW POWERMILL (Osaka Chemical Co., Ltd., NEW POWERMILL PM-2005). The pulverizing was performed for one minute×5 times, that is, for 5 minutes in total at the maximum rotation speed. The sizes of the obtained pulverized substances were divided using a stainless steel sieve to obtain uncross-linked blocks with 25 to 53 μm, 53 to 106 μm, and 106 to 180 μm. Thereafter, biocompatible macromolecular blocks (CBE3 blocks) were obtained by performing thermal cross-linking (six kinds of cross-linking times of 8 hours, 16 hours, 24 hours, 48 hours, 72 hours, and 96 hours) at 160° C. under reduced pressure.

Hereinafter, a porous body-derived block under the condition A which has been cross-linked for 48 hours is called E, and a porous body-derived block under the condition B which has been cross-linked for 48 hours is called F, E and F are blocks with a small difference in temperature which have been produced from porous bodies produced through a freezing step in which the difference in temperature is small. There was no influence of the difference in cross-linking time on the performance in the evaluation of the present specification. Therefore, the blocks cross-linked for 48 hours were representatively used. In addition, there was no difference in performance between E and F. Hereinafter, the biocompatible macromolecular blocks obtained in Example 3 are also referred to as "petal blocks". In Examples 4 to 7, biocompatible macromolecular blocks which have sizes of 53 to 106 μm, are produced under the condition A, and of which the cross-linking time is 48 hours were used.

[Example 4] Production of Cell Structure (hMSC and Capan-1)

Cell suspensions obtained by adjusting a MSCGM BulletKit™ medium (company name: Lonza Japan, product name: MSCGM™ Mesenchymal Stem Cell Growth Medium BulletKit™) such that the final concentration of human bone marrow-derived mesenchymal stem cells (hMSC: human mesenchymal stem cell, purchased from Lonza) becomes 4×10⁵ cells/mL and the final concentration of an established human pancreatic adenocarcinoma cell (Capan-1 purchased from ATCC) becomes 4×10⁵ cells/mL were prepared, and 25 μL of each of the cell suspensions were mixed with each other. The biocompatible macromolecular blocks (sizes of 53 to 106 μm) produced in Example 3 were added to the mixed cell suspension so as to make a concentration of 0.1 mg/mL. 200 μL of the obtained mixture was sown in a SUMILON CELL TIGHT X96U plate (of which the bottom was in a U-shape and was manufactured by Sumitomo Bakelite Co., Ltd.), and the plate was centrifuged in Mini Plate Centrifuge (600 g, 5 minutes) and was allowed to stand for 24 hours to produce mosaic cell aggregations (0.001 μg of blocks per cell) which have a spherical shape with about a diameter of 1 mm or 1.3 mm and are formed of the biocompatible macromolecular blocks, Capan-1, and hMSC. Thus obtained 16 mosaic cell aggregations were collected in one well of the 96U plate and allowed to further stand for 24 hours to prepare tissue in which the mosaic cell aggregations were collected.

In addition, cell aggregations (hMSC and Capan-1) were produced as a comparative example without adding biocompatible macromolecular blocks thereto.

Figure 4:
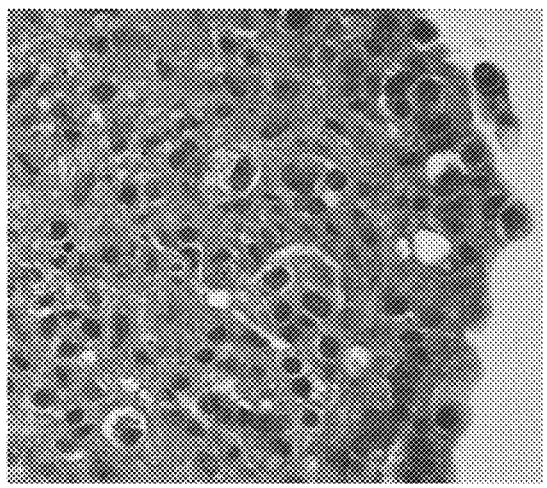
FIG. 4 shows a result obtained by observing a mosaic cell aggregation to which a biocompatible macromolecular block is added and a cell aggregation to which no biocompatible macromolecular block is added, with a microscope.
Figure 4:
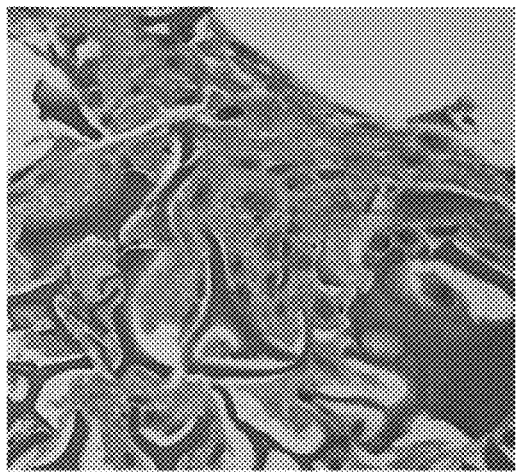

Four days after preparing mosaic cell aggregations to which biocompatible macromolecular blocks were added and cell aggregations to which biocompatible macromolecular blocks were not added, the cell aggregations were fixed with a 10 mass % neutral formalin buffer solution and stained with hematoxylin and eosin for observation using a microscope. The results are shown in FIG. 4.

In a case where biocompatible macromolecular blocks were not added to cell aggregations, necrosis of hMSC was observed inside the cell aggregations, and relatively many Capan-1 cells were found. Remaining hMSC was left to be undifferentiated and the differentiation into fibroblasts was weak.

In a case where biocompatible macromolecular blocks were added to cell aggregations, necrosis of hMSC was not observed inside the cell aggregations, and hMSC and Capan-1 cells were survived almost at a ratio of 1:1. Differentiation into fibroblasts was observed although hMSC was incomplete.

[Example 5] Transplantation of Mosaic Cell Aggregation and Cell Aggregation (Evaluation in Animal Model)

The mosaic cell aggregations (to which biocompatible macromolecular blocks were added) or the cell aggregations (to which biocompatible macromolecular blocks were not added) produced in Example 4 were implanted subcutaneously into an anesthetized 6-week female mouse with non-obese diabetic-severe combined immunodeficiency (NOD-SCID) using Spatel (PP Microspatel As One #1-9404-01), and then, the insertion portion was sutured.

Figure 5:
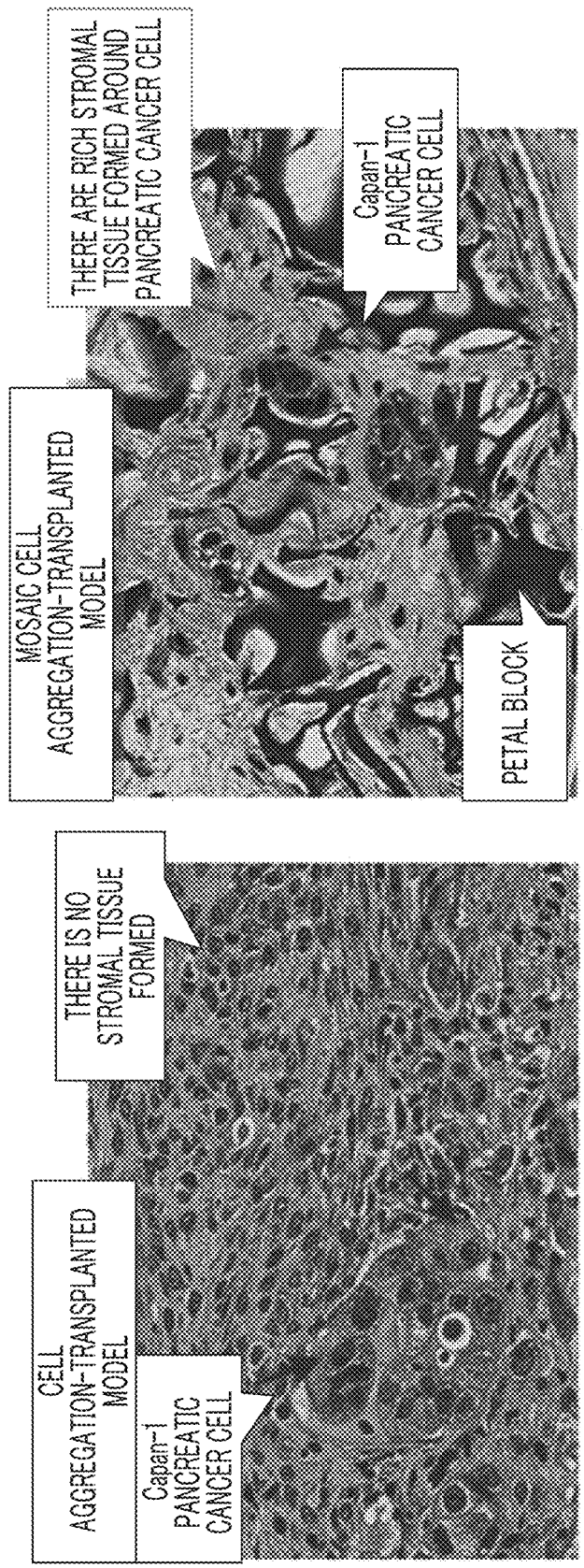
FIG. 5 shows a result obtained by transplanting a mosaic cell aggregation to which a biocompatible macromolecular block is added or a cell aggregation to which no biocompatible macromolecular block is added, into an animal, and observing the aggregations.

7 days after transplantation, bleeding and slaughtering were performed, and the mosaic cell aggregations or the cell aggregations were checked. Each piece of surrounding subcutaneous tissue was collected and fixed with a 10 mass % neutral formalin buffer solution to prepare a hematoxylin and eosin staining specimen through a standard method. Then, the specimen was observed with a microscope. The results are shown in FIG. 5.

In a case where the mosaic cell aggregations were transplanted, fibroblasts and fibrous tissue were recognized in the gap between basophilic structures considered as petal blocks. The fibrous tissue was a tumor (right side of FIG. 5) showing a tissue form rich in stromal cells in which Capan-1 pancreatic cancer cell-derived cells existed in island shapes.

In a case where the cell aggregations were transplanted, cells which showed a glandular duct structure and were considered as being derived from Capan-1 existed in island shapes in mesenchymal tissue considered as being derived from hMSC. Fibrous tissue was poor compared with the case where the mosaic cell aggregations were transplanted (left side of FIG. 5).

As described above, rich fibrosis and stromal tissue formation were recognized in vivo in the case where Capan-1 and hMSC were transplanted into the mosaic cell aggregations, and therefore, it was possible to produce a model close to the pathological condition of human pancreatic cancer.

SEQUENCE TABLE

International Application 16F00586 Cell Structure and Non-Human Model Animal JP16072137 20160728-000501511516015820030 Normal 201607281230082 01607191222129100_P1AP101_—16_1.app Based on International Patent Cooperation

---

What is claimed is:

1. A non-human model animal for a pancreatic cancer disease, comprising a transplant comprising:
   a cell structure which contains a plurality of biocompatible macromolecular blocks having amorphous shape and a size of 1 μm to 700 μm, a plurality of human-derived pancreatic cancer cells, and a plurality of human-derived mesenchymal cells,
   wherein the plurality of biocompatible macromolecular blocks are arranged in gaps between the plurality of cells,
   the plurality of biocompatible macromolecular blocks and the pluralities of cells are alternately arranged,
   a rich stromal tissue is formed around the plurality of human-derived pancreatic cancer cells,
   the biocompatible macromolecular blocks are obtained by pulverizing porous bodies comprising biocompatible macromolecules, and
   spaces are provided between the pancreatic cancer cells and the mesenchymal cells.

2. The non-human model animal according to claim 1, wherein the pancreatic cancer cells are established cancer cells.

3. The non-human model animal according to claim 1, wherein the mesenchymal cells are mesenchymal stem cells.

4. The non-human model animal according to claim 1, wherein the cell structure transplant is under the skin of the animal.

5. The non-human model animal according to claim 1, which has decreased immunity or is immunodeficient.

6. A method for evaluating a test substance, comprising: administering a test substance to the non-human model animal according to claim 1.

* * * * *